United States Patent
Richardson

(10) Patent No.: US 9,727,896 B2
(45) Date of Patent: Aug. 8, 2017

(54) SYSTEMS, APPARATUS AND METHODS FACILITATING MOBILE COMMUNICATIONS

(71) Applicant: Johnnie E Richardson, North Las Vegas, NV (US)

(72) Inventor: Johnnie E Richardson, North Las Vegas, NV (US)

(73) Assignee: Johnnie E. Richardson, North Las Vegas, NV (US)

( * ) Notice: Subject to any disclaimer, the term of this patent is extended or adjusted under 35 U.S.C. 154(b) by 0 days.

(21) Appl. No.: 14/657,861

(22) Filed: Mar. 13, 2015

(65) Prior Publication Data

US 2015/0262240 A1    Sep. 17, 2015

Related U.S. Application Data

(60) Provisional application No. 61/952,220, filed on Mar. 13, 2014.

(51) Int. Cl.
*G06Q 30/02* (2012.01)
*G09G 3/3208* (2016.01)

(52) U.S. Cl.
CPC ....... *G06Q 30/0267* (2013.01); *G09G 3/3208* (2013.01); *G09G 2300/026* (2013.01); *G09G 2320/0233* (2013.01); *G09G 2320/041* (2013.01); *G09G 2320/0626* (2013.01); *G09G 2320/0646* (2013.01); *G09G 2360/144* (2013.01); *G09G 2370/12* (2013.01); *G09G 2370/16* (2013.01)

(58) Field of Classification Search
None
See application file for complete search history.

(56) References Cited

U.S. PATENT DOCUMENTS 5,995,179 A * 11/1999 Tamura ................. G09F 9/3026
                                                        349/58
6,843,012 B1 * 1/2005 Dodd ...................... G09F 21/02
                                                        224/627

(Continued)

FOREIGN PATENT DOCUMENTS

JP          2000216420 A  *  8/2000

*Primary Examiner* — Christle I Marshall
(74) *Attorney, Agent, or Firm* — Amin, Turocy & Watson, LLP

(57) ABSTRACT

Systems, apparatus and methods facilitating communication are provided. In one embodiment, an apparatus includes: a first display device having a display region configured to display electronic advertising content; and a first support structure coupled to the first display device and configured to attach to a wearer of the first display device to facilitate portability of the apparatus. In some embodiments, a system includes: a first display device configured to display first electronic advertising content; and a second display device configured to display second electronic advertising content, wherein the first display device and the second display device are adjustably positioned in an arrangement relative to one another to display an advertising message, wherein the advertising message is comprised of the first electronic advertising content and the second electronic advertising content, and wherein the first display device and the second display device are mobile devices.

15 Claims, 25 Drawing Sheets

(56) References Cited

U.S. PATENT DOCUMENTS

| | | | | |
|---|---|---|---|---|
| 7,265,970 B2 * | 9/2007 | Jordan | | G09F 21/02 361/679.27 |
| 7,453,418 B2 * | 11/2008 | Palmquist | | G06F 1/1601 345/1.1 |
| D670,764 S * | 11/2012 | Han | | D20/19 |
| 8,626,586 B1 * | 1/2014 | Biere | | G06Q 30/0241 705/14.49 |
| 9,083,066 B2 * | 7/2015 | Ketkar | | H01M 10/6569 |
| 9,179,111 B2 * | 11/2015 | Collier | | H04N 9/12 |
| 9,536,458 B2 * | 1/2017 | Evans | | A45F 3/14 |
| 2006/0163303 A1 * | 7/2006 | Trutanich | | A45F 3/04 224/576 |
| 2006/0249248 A1 * | 11/2006 | Iandoli | | B32B 17/10018 156/256 |
| 2008/0047991 A1 * | 2/2008 | Everett | | A45F 3/10 224/265 |
| 2009/0051561 A1 * | 2/2009 | Cadavid | | G06Q 30/02 340/691.6 |
| 2009/0128461 A1 * | 5/2009 | Geldard | | G06F 3/1446 345/84 |
| 2009/0234740 A1 * | 9/2009 | Jabbari | | G06Q 30/02 705/14.62 |
| 2010/0050485 A1 * | 3/2010 | Forte | | G09F 21/02 40/1.5 |
| 2010/0060669 A1 * | 3/2010 | Cheng | | G09G 3/3406 345/690 |
| 2011/0294607 A1 * | 12/2011 | Roberts | | A63B 24/00 473/455 |
| 2012/0013651 A1 * | 1/2012 | Trayner | | G02B 5/32 345/690 |
| 2013/0162120 A1 * | 6/2013 | Campagna | | H04N 5/64 312/223.1 |
| 2014/0098088 A1 * | 4/2014 | Ryu | | G06F 3/011 345/419 |

* cited by examiner

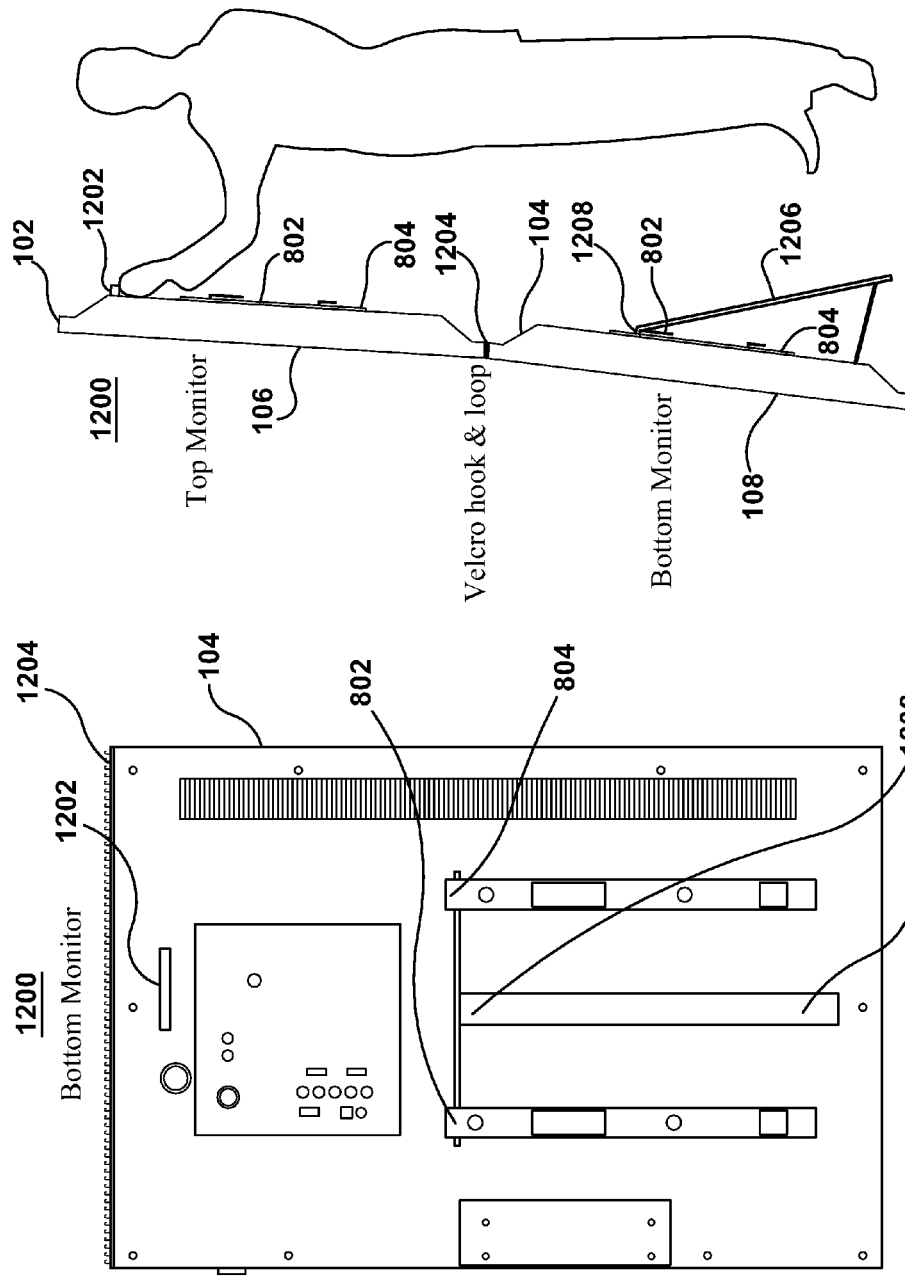

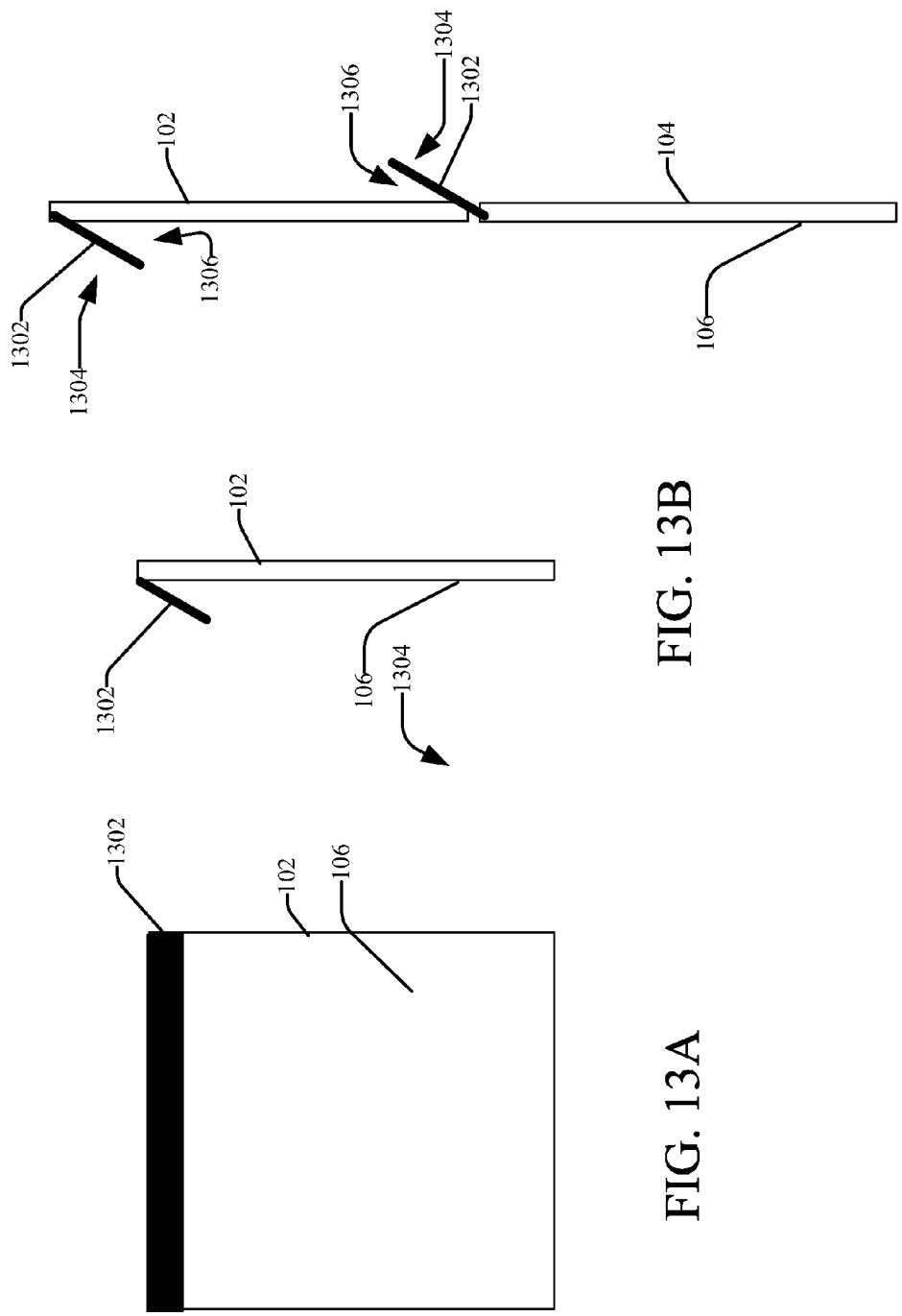

SYSTEMS, APPARATUS AND METHODS FACILITATING MOBILE COMMUNICATIONS

CROSS-REFERENCE TO RELATED APPLICATION

This application claims priority to and the benefit of U.S. Provisional Patent Application No. 61/952,220, titled "SYSTEMS, APPARATUS AND METHODS FACILITATING MOBILE ADVERTISING," filed on Mar. 13, 2014, and the entirety of which is incorporated herein by reference.

FIELD

The present application relates generally to communications, and, more specifically, to systems, apparatus and methods facilitating mobile communications.

BACKGROUND

Communications generally, and advertising communications, in particular, are of the utmost importance in today's competitive marketplace. Brand recognition in conjunction with the promotion of services and/or goods are key factors in business success. However, information on fixed billboards can disadvantageously become outdated. Further, the size and cost of fixed billboards can be prohibitive and may not make an immediate impact on potential consumers. Accordingly, systems, apparatus and methods facilitating mobile communications are desired.

SUMMARY

The following presents a simplified summary of one or more of the embodiments in order to provide a basic understanding of one or more embodiments of the embodiments. This summary is not an extensive overview of the embodiments described herein. It is intended to neither identify key or critical elements of the embodiments nor delineate any scope of embodiments or the claims. Its sole purpose is to present some concepts of the embodiments in a simplified form as a prelude to the more detailed description that is presented later. It will also be appreciated that the detailed description may include additional or alternative embodiments beyond those described in the Summary section.

In one or more embodiments, an apparatus is provided. The apparatus includes: a first display device having a display region configured to display electronic advertising content; and a first support structure coupled to the first display device and configured to attach to a wearer of the first display device to facilitate portability of the apparatus.

In one or more embodiments, a system is provided. The system includes: a first display device configured to display first electronic advertising content; and a second display device 104 configured to display second electronic advertising content. The first display device and the second display device are adjustably positioned in an arrangement relative to one another to display an advertising message, and the advertising message includes the first electronic advertising content and the second electronic advertising content. The first display device and the second display device are mobile devices.

In one or more embodiments, a method is provided. The method includes: displaying, by a first display device including a first processor, first electronic advertising content; and displaying, by a second display device including a second processor, second advertising content. The second display device and the first display device are adjustably positioned in an arrangement relative to one another to display an advertising message, wherein the advertising message is composed of the first electronic advertising content and the second electronic advertising content, and wherein the first display device and the second display device are mobile devices.

BRIEF DESCRIPTION OF THE DRAWINGS

Purposes and scope of the exemplary embodiments described below will be apparent from the following detailed description in conjunction with the appended figures in which:

FIGS. 12A, 12B are illustrations of bottom and side views of non-limiting exemplary display devices that facilitate mobile advertising in accordance with embodiments described herein;

FIGS. 13A and 13B are illustrations of front and side views of a non-limiting exemplary display device with a visor that facilitates mobile advertising in accordance with embodiments described herein;

FIG. 13C is an illustration of a side view of stacked non-limiting exemplary display devices with visors that facilitate mobile advertising in accordance with embodiments described herein;

DETAILED DESCRIPTION

Figure 1:
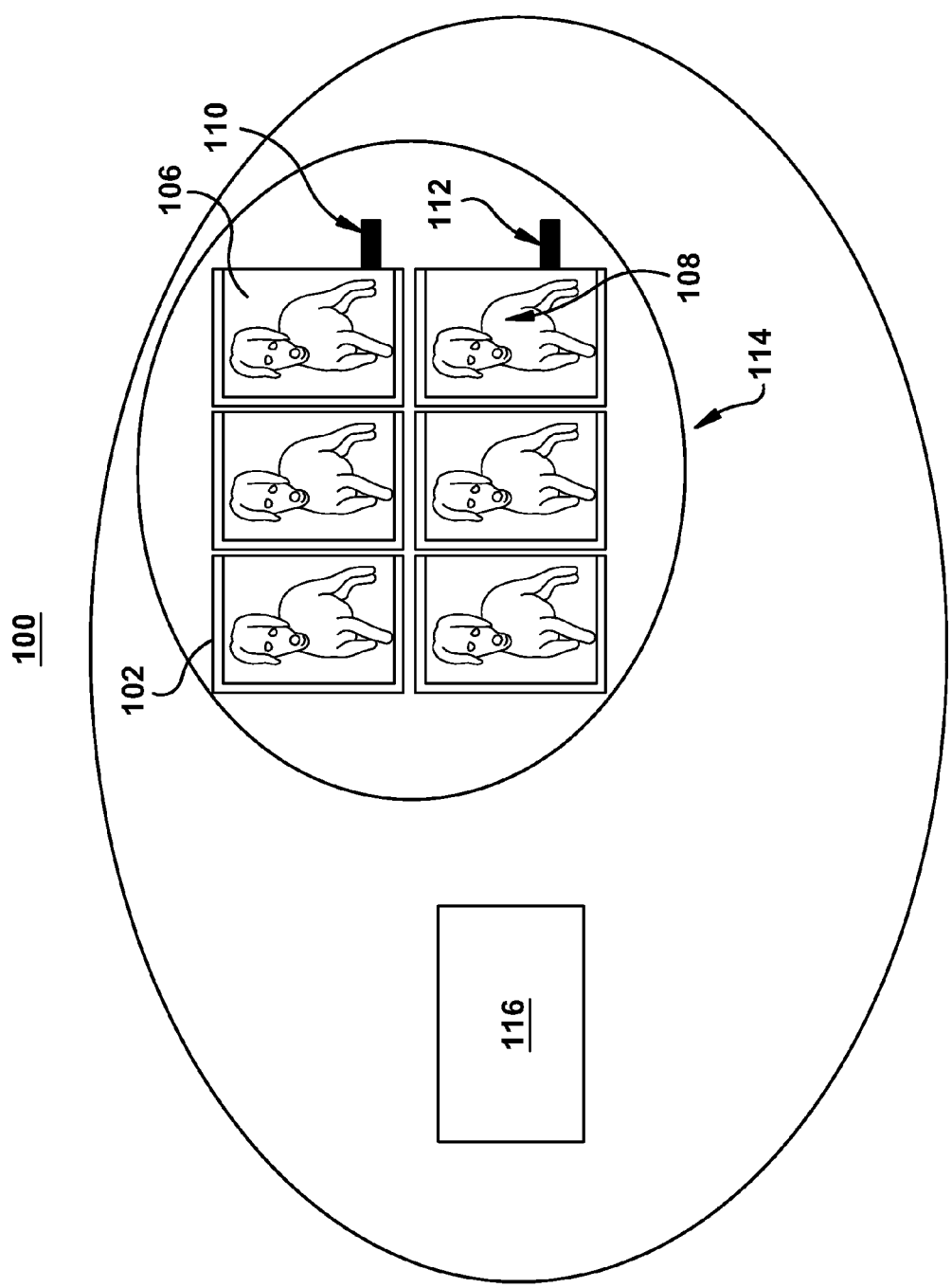
FIGS. 1 and 2 are illustrations of non-limiting exemplary systems facilitating mobile advertising in accordance with embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "device," "display devices," "portable display devices," "mobile display devices," "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a system, method, apparatus or article of manufacture using standard programming and/or engineering techniques to produce software, firmware, hardware or any combination thereof to control a computer to implement the disclosed subject matter or one or more portions of the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device," "control device" or "remote control" (and/or terms representing similar terminology) can refer to a wireless device configured to transmit and/or receive information over one or more wireless or optical or infrared channels to transmit and/or receive or convey data, control, voice, video, sound, gaming or substantially any data-stream or signaling-stream. Data and signaling streams can be packetized or frame-based flows.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies.

Communications generally, and advertising communications, in particular, are of the utmost importance in today's competitive marketplace. Brand recognition in conjunction with the promotion of services and/or goods are key factors in business success. However, information on fixed billboards can disadvantageously become outdated. Further, the size and cost of fixed billboards can be prohibitive and may not make an immediate impact on potential consumers.

The embodiments described herein include systems, apparatus and methods facilitating mobile advertising. One or more of the embodiments can significantly improve the functionality of the computer technology, power sources and/or circuitry of the display devices via systems, apparatus and methods of cooling power sources and/or computer processors of the display devices notwithstanding the display devices may be used in outdoor areas in environments that reach high temperature and/or for extended periods of time.

The systems, apparatus and/or methods described herein of displaying different electronic advertising content is distinct from the traditional approach of advertising information on stationary billboards since the advertising content is superior in that the content includes motion and/or sound. Additionally, the approaches described herein are superior to standard television commercials because the advertising can be changed and therefore tailored depending on the location in which the advertising is provided. Further, the impression made by tiling numerous electronic advertising content or by combining electronic advertising content is unique and can be achieved only through the use of display devices as described herein. The embodiments are flexible enough to first present tiled information and flexibly present a composite image seconds or minutes later. The particular arrangement of the display devices is also unique and advantageous for visibility to passersby in a number of different locations and/or for capturing the attention of passerby via moving display devices. One or more embodiments also provide an improvement in display technology (e.g., selectively lighting particular light sources to combat glare, improve brightness and the like).

Figure 2:
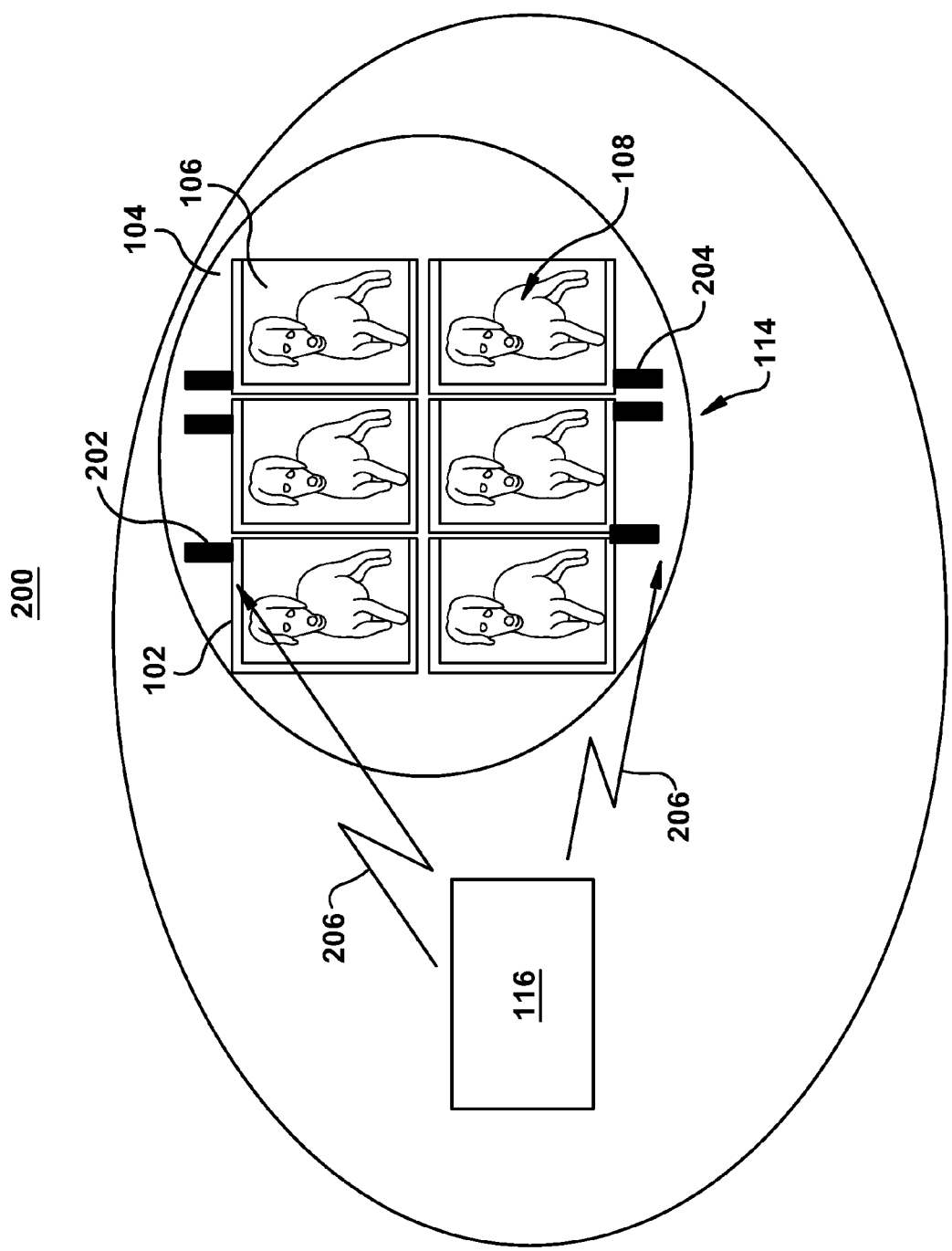

FIGS. 1 and 2 are illustrations of non-limiting exemplary systems facilitating mobile advertising in accordance with embodiments described herein. Systems 100, 200 can provide mobile advertising via one or more portable display devices 102, 104 having display screens/regions 106, 108. In various embodiments, a group 114 of display devices can be provided to display a defined message over one or more of the display devices within the group 114. The advertising content can be provided by a source 116 of electronic advertising content (e.g., a computer configured to format electronic advertising content) and the source 116 can provide electronic advertising content that can be stored on portable storage device 110, 112 or transmitted over a wired or wireless channel 206. In the embodiments in which the electronic advertising content is provided over the wireless channel 206, the display devices 102, 104 can have receivers or transceivers 202, 204 configured to receive and process electric signals from the source 116.

The mobile advertising can be moved from one location to another location from time to time by any manual or automated transport mechanism. Further, the mobile advertising can form different displays of advertising messages from time to time. In various embodiments, the mobile advertising can be provided in public areas (e.g., airports, stadiums, Superbowl or other sports-related gatherings, streets or semi-private areas (e.g., trade shows, convention centers), private areas and/or any other heavily-populated area based on the nature of the advertising and demand of the third-party advertiser. Accordingly, one or more embodiments of the systems, apparatus and methods facilitating mobile advertising described herein can advantageously provide an avenue for third-party companies to advertise and increase brand awareness in locales in which large billboards are prohibited, not easily accessible, cost-prohibitive or in which more personal advertising or short-term (on the order of minutes, hours or days) is desired.

In various embodiments, the electronic advertising content can be content generated or originating from any number of different sources 116 (e.g., an advertising content generation center or advertising content generation computer) located remote from the display devices 102, 104 and/or a third-party customer location.

In some embodiments, the electronic advertising content can be stored on a storage device 110, 112. For example, the storage device (e.g., storage device 110) can be a removable storage device that can have different electronic advertising content stored on the device from time to time. In some embodiments, the electronic advertising content can be stored on a data storage device having flash memory with an integrated USB interface (e.g., USB storage device). The content can be stored in an H.264 format or any other type of video (as the video need not be high-definition).

The display device 102 can include a USB port for receipt of the USB interface thereby providing the display device 102 access to the advertising content on the storage device. The USB device is one mere example of storage devices on which the advertising content can be stored for access by the first display device 102 and/or the second display device 104. For example, in other embodiments, any number of other different types of portable storage devices 110, 112 can be employed including, but not limited to, digital video disk (DVD). For example, the first and second display devices 102, 104 can be configured to receive and read a DVD storing advertising content and display the content read.

In some embodiments, the electronic advertising content can be loaded into a non-removable storage of the display device 102. In this case, electronic advertising content can be overwritten with new content from time to time.

In some embodiments, the electronic advertising content can be stored at a location remote from the display devices 102, 104 and transmitted wirelessly over one or more wireless channels to the first or second display devices 102, 104. For example, the electronic advertising content can be streamed from a transmitter to the HDMI-compatible wireless receiver (or other receiver configured to receive video over a wireless channel) electrically coupled to the first or second display devices 102, 104. In other embodiments, content can be transmitted any number of ways including, but not limited to, via Mobile High-Definition Link (MHL) protocol. In some embodiments, to increase the distance over which content can be transmitted to the receiver, one or more boosters configured to boost a signal received from the transmitter can be provided between the transmitter and the location of the display device 102 receiver so as to increase the distance for streaming of advertising content.

In embodiments in which a single image is formed based on a composite of multiple images displayed on the respective multiple display devices 102, 104, the electronic advertising content to be displayed on each display device 102 is pre-formatted to separate different individual portions of a single image/video frame for display on the different display devices 102, 104. Then each set of content is assigned to a different storage device. The storage device is assigned to a matching display device. The video on the set of storage devices are precisely time-mapped and then replayed on the respective display device.

In embodiments in which the displays each display the same image (e.g., same image displayed multiple times left to right), the content is pre-formatted and each storage device for each of the display device 102 includes the same content. Then each set of content is assigned to a different storage device.

In either embodiment, a single control device (e.g., remote control) is assigned the same frequency for the multiple devices. For example, each of the devices can receive a control signal from the control device on the same frequency. As such, display of the advertising content is initiated simultaneously (or concurrently) and the same (or approximately the same) content displays simultaneously (or concurrently).

The electronic advertising content can include the same content over each of the display devices 102, 104 or different information. For example, the different information can be portions of a single advertising message that can be a composite image formed from portions of the single still or video frame image displayed on the display devices 102, 104 arranged adjacent one another. For example, the advertising content can be spliced employing a video editing component to separate portions of the advertising content into separate files. In some embodiments, the advertising content can be spliced employing video editing component based on the number of display devices 102, 104 and/or desired presentation of information. For example, if there are six display devices 102, 104, the content can be spliced into six different portions, with each portion assigned to a different display device. The splicing can be performed vertically (with subsequent vertical arrangement of the display devices 102, 104) or horizontally (with subsequent horizontal stacking of the display devices 102, 104) or a combination of vertical and horizontal (e.g., separating the content into tiles) with a configuration of combined vertical and horizontal stacked arrangement.

In some embodiments, the electronic advertising content can be pre-formatted using the video editing component, which can be provided on or coupled to a personal computer or laptop or other electronic device on which the video editing can be performed. In some embodiments, the video can be formatted to be 1280 long×720 wide to facilitate display devices 102, 104 that display horizontally. The video can be formatted with different dimensions for other display devices 102, 104 that display vertically, for example.

In some embodiments, each receiver (e.g., HDMI receiver) for each respective display device 102 can be assigned to a separate receiver frequency and the transmitter (e.g., HDMI transmitter) can send a signal including the electronic advertising content to each receiver and play each content according to each receiver.

The respective files will then be assigned to respective display devices 102, 104 for display on the display devices 102, 104. In some embodiments, a storage device (e.g., portable storage device 110) is electrically coupled to the first display device 102 and configured to store the first electronic advertising content, and the first display device 102 can access at least a portion of the first electronic advertising content from the storage device and display the accessed portion of the first electronic advertising content.

After display of the electronic advertising content, the display devices 102, 104 can be re-located to another geographical location for display due to the mobile nature of the display devices 102, 104. For example, in a first location, the display devices 102, 104 can be arranged in a two-tier tiled arrangement and can display first advertising content. The display devices 102, 104 can then be re-located to a second geographic location and re-positioned in a second arrangement (e.g., circular arrangement). The display devices 102, 104 can be placed adjacent one another or carriers of the display devices 102, 104 can arrange in a particular configuration to create different arrangements of advertising content displays. The second display at the second geographic location can be the same advertising message shown at the first geographic location or a different advertising message.

In some embodiments, the display devices 102, 104 can move around to various different locations. For example, the display devices 102, 104 can include wheels or other apparatus for moving or sliding from one location to another location. In some embodiments, a moving kiosk can be provided that includes one or more display devices 102, 104. The kiosk or components of the kiosk can move from one location to another or in a particular pattern elevated in mid-air (e.g., display devices 102, 104 that are part of the kiosk can move around in a circular or other pattern or arrangement themselves to form a tiling formation for display of particular content).

In some embodiments, the display device 102 can include a motorized component coupled to one or more display devices 102, 104 or located within the one or more display device. Individual display devices 102, 104 could be placed on wheels and can move around in different patterns (e.g., circle pattern). The motorized component can dictate the particular movement of the In some embodiments, the kiosk can include one or more sensors that can sense a location or terrain or proximity to another component, wall or the like. The kiosk can also include a processor that can control the movement of the kiosk in response to information sensed by the one or more sensors on or communicatively coupled to the kiosk. As such, based on the one or more sensors sensing that the kiosk is moving or is now located in close proximity to a wall or other object, the processor can generate a signal to cause the kiosk to stop or move in a different direction so as to reduce the likelihood of colliding with the wall or object. The kiosk can also include a motor that generates the movement of the kiosk by controlling the movement of the wheels, sliders or other components that cause the kiosk to move, stop, change direction, reduce speed, increase speed, turn on, turn off or the like.

In some embodiments, a computer-readable storage medium can store instructions that can enable the display device 102 to be geographically tracked. For example, in some embodiments, an application can be downloadable to a mobile phone, tablet or other device that can provide information indicative of the geographical location of the display device 102 based on a chip or other device attached to or located within the display device 102 that can allow a global positioning system (GPS) information to be identified for the location of the display device. The customer paying for the advertising and/or the owner of the display device 102 can track the location of the display device.

In some embodiments, in lieu of storing the advertising content on a removable storage, near field communication or BLUETOOTH communication. For example, in some embodiments, a wireless channel is established between a source of the electronic advertising content and the display device, and albeit there is no physical contact with the content source and the display device, the content can be transferred using near field communication or BLUETOOTH communication transferring the content between a wireless device outside the display device 102 and the display device 102. In other embodiments, any number of different wireless communication protocols can be employed to transfer information between the display device 102 and the source of the electronic advertising content. In some embodiments, infrared communications can be employed between the source of the advertising content and the display device 102 such that the electronic advertising content can be transmitted from the source of the content to the display device 102 using infrared technology. The display device 102 can be configured to receive information via infrared or communication. For example, an infrared link can be established between the display device 102 and the source of the electronic advertising content.

Any number of different protocols can be employed to transfer information wirelessly including, but not limited to, Embodiments described herein can be exploited in substantially any wireless or wired communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. In the embodiments described herein, optical communication can be employed to transfer the information between the source of the electronic advertising content and the display device.

In some embodiments, the display devices 102, 104 can be preloaded with advertising content of a defined running time (e.g., two hours). After the defined running time has elapsed, the playback/display of the advertising content can re-start automatically or based on receipt of a control signal (e.g., from a remote control device).

In one embodiment, the system includes one or more portable display devices 102, 104 configured to access and display electronic advertising content. In some embodiments, the portable display devices 102, 104 are electrically coupled to respective storage devices that stores advertising content. In other embodiments, the display devices receive advertising content over one or more wireless channels from an advertising content component that transmits advertising content to the respective display devices.

Figure 3:
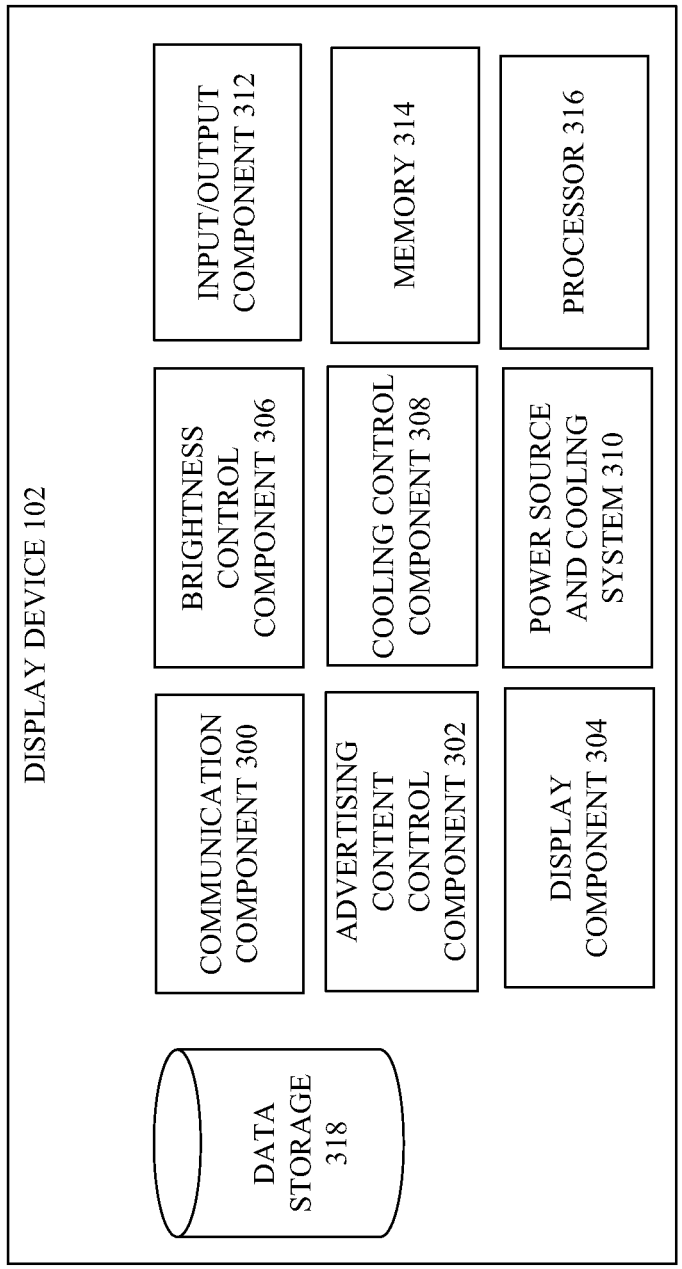
FIG. 3 is an illustration of a non-limiting exemplary display device of the systems of FIGS. 1 and 2 facilitating mobile advertising in accordance with embodiments described herein.

FIG. 3 is an illustration of a non-limiting exemplary display device of the systems of FIGS. 1 and 2 facilitating mobile advertising in accordance with embodiments described herein. Repetitive description of like elements employed in other embodiments described herein is omitted for sake of brevity.

Display device 102 can include communication component 300, advertising content control component 302, display component 304, brightness control component 306, cooling control component 308, power source and cooling system 310, input/output component 312, memory 314, processor 316 and/or data storage 318. In various embodiments, one or more of communication component 300, advertising content control component 302, display component 304, brightness control component 306, cooling control component 308, power source and cooling system 310, input/output component 312, memory 314, processor 316 and/or data storage 318 can be electrically and/or communicatively coupled to one another to perform one or more functions of the display device 102.

The display device 102 is configured to process and display electronic advertising content received at or otherwise accessible to the display device 102. In some embodiments, the input/output (I/O) component 312 can be configured to receive and/or read electronic information (e.g., electronic advertising content) stored on a portable storage device electrically and/or communicatively coupled to the I/O component 312. For example, in some embodiments, the I/O component 312 can include a USB port configured to receive and/or process a portable storage device storing electronic advertising content.

In some embodiments, the communication component 300 transmit and/or receive electronic advertising content to and/or from the display device 102 and/or the source of advertising content in embodiments in which the electronic advertising content is transmitted over wireless or wired channels to the display device 102 (in lieu of or in addition to being provided at the display device 102 locally via a portable storage device). In some embodiments, the communication component 300 can also receive information indicative of the manner in which the electronic advertising content should be processed, displayed or the like (e.g., how long or when the electronic advertising content should be displayed).

The electronic advertising content, instructions for displaying and/or processing the electronic advertising content and the like can be stored at the data storage 318 of the display device 102.

The display component 304 can include a display screen configured to display information (e.g., text, graphics) indicative of the particular electronic advertising content. In some embodiments, the display component 304 can also include speakers or other hardware, software or circuitry for causing sound to be emitted from the display device 102 in conjunction with the wording, speech or other sounds corresponding to the electronic advertising content. In various embodiments, the display component 304 can be designed to be any number of different resolutions. For example, in various embodiments, the resolution can be 640×480 pixels, 1280×720 pixels or 1920×1080 pixels. In other embodiments, any number of pixels/resolution can be employed and need not be limited to the aforementioned examples. The display component 304 can be configured to display high-definition video (e.g., 720 progressive-scan (720p) and 1080 interlaced-scan (1080i) resolutions) or any number of other resolutions, which can change from time to time.

In some embodiments, the display component 304 can include one or more components for displaying three-dimensional electronic advertising content including, but not limited to, a polarized three-dimensional system, active shutter three-dimensional systems and/or components to provide autosteroscopy without requiring passersby viewing the display device 102 to wear glasses (e.g., Auto3D components). Active shutter three-dimensional systems and polarized three-dimensional systems can be viewed by passersby wearing special glasses (e.g., liquid crystal shutter glasses for active shutter three-dimensional systems; polarized glasses for polarized three-dimensional systems).

In some embodiments, in lieu of or in additional to the use of glasses worn by passersby or viewers of the display device 102, a system including the display device 102 can include a lens (not shown) that can be positioned in front of the display component 304 (e.g., remote from the display component 304, perhaps positioned on the ground/floor several feet in front of the display component 304). The lens can be configured to cause depth perception of the three-dimensional advertising content upon viewing the display component 304 through the lens.

Memory 314 can be a computer-readable storage medium storing computer-executable instructions and/or information for performing the functions described herein with reference to the display device 102 (or any component of the display device 102). For example, memory 314 can store computer-executable instructions that can be executed by processor 316 to process and/or display electronic advertising content, to process instructions regarding how to display the electronic advertising content, to determine whether to activate a pump for cooling one or more components of the display device 102, to determine whether to brighten or dim the display of the display component 304 or the like. Processor 316 can perform one or more of the functions described herein with reference to display device 102 (or any component thereof). For example, processor 316 can process level of brightness information, electronic advertising content, cause the display device 102 to be powered on or off or any number of other functions as described with reference to the display device 102.

The structure functionality of the advertising content control component 302, brightness control component 306, cooling control component 308 and the power source and cooling system will be described in greater detail with reference to FIGS. 4, 5, 6 and 7, respectively. Additionally, while the display device has been described in FIG. 3 reference (and other figures described herein) to display device 102, one or more of the structures and/or functionalities of the display devices described herein with reference to display device 102 can be provided in display device 104.

Figure 4:
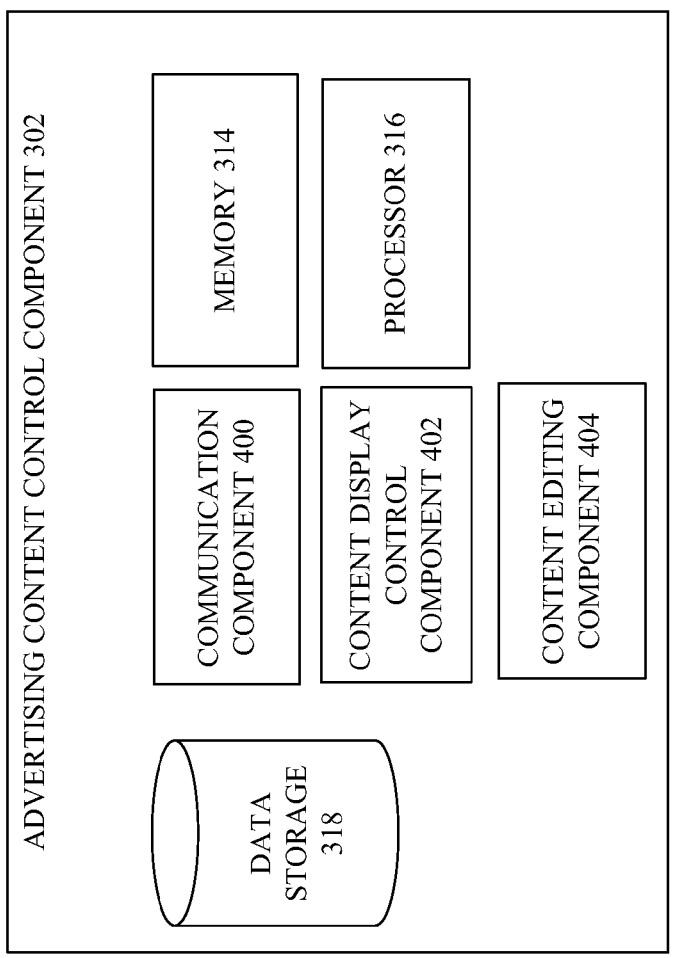
FIG. 4 is an illustration of a non-limiting exemplary advertising content control component of the display device of FIG. 3 facilitating mobile advertising in accordance with embodiments described herein.

Turning first to FIG. 4, shown is an illustration of a non-limiting exemplary advertising content control component of the display device of FIG. 3 facilitating mobile advertising in accordance with embodiments described herein. Repetitive description of like elements employed in other embodiments described herein is omitted for sake of brevity.

Advertising content control component 302 can include communication component 400, content display control component 402, content editing component 404, memory 314, processor 316 and/or data storage 318. In various embodiments, one or more of communication component 400, content display control component 402, content editing component 404, memory 314, processor 316 and/or data storage 318 can be electrically and/or communicatively coupled to one another to perform one or more functions of the advertising content control component 302.

The communication component 400 can receive electronic advertising content and, in some embodiments in which instructions are provided, the communication component 400 can also receive electronic information indicative of the instructions for displaying the electronic advertising content. The content display control component 402 can control the display of the electronic advertising content displayed. In some embodiments, after processing (e.g., formatting, filtering) the electronic advertising content (e.g., via the content editing component 404), the communication component 400 can output the electronic advertising content to the display component 304 for display. In some embodiments, the content editing component 404 can format the content to fit the particular dimensions or specifications of the display component 304. In some embodiments, the content editing component 404 can process information that may require additional processing for three-dimensional content or the like.

Although embodiments described herein describe electronic advertising content, it is understood that descriptions of processing, display and/or receipt of electronic advertising content apply to electronic information that is not advertising content (e.g., sporting events, television programs, movies). As such, the electronic advertising content can be interchanged for and/or is applicable to electronic content that is not advertising content. All such embodiments are envisaged.

In some embodiments, the content display control component 402 can process information received for real-time or near-real time display. For example, the communication component 400 can receive or obtain access to a broadcast signal containing information depicting a sporting event (e.g., broadcast signal of the Superbowl, Wimbledon or the Final Four). The display component 304 can display (e.g., stream) the sporting event/broadcast signal live or in near real-time (with a delay of seconds or milliseconds) from receipt or transmission of the broadcast signal.

In some embodiments, the content display control component 402 and/or the content editing component 404 can be configured to process and/or display information encrypted with an expected encryption key (or is encrypted in a manner that can be decrypted by the display device 102) to reduce the likelihood of third-parties intentionally or unintentionally transmitting a broadcast signal on a frequency received by the display device 102 (and thereby reducing the likelihood of display of incorrect information). In some embodiments, the content editing component 404 can filter out information received wirelessly that is not intended for display via the display device 102 (e.g., content on neighboring frequencies). For example, the content editing component 404 can filter cross-over between content being streamed on a near frequency so as to reduce the interference from other sources. The filtering can be provided to reduce the amount of overlap of signals.

Figure 5:
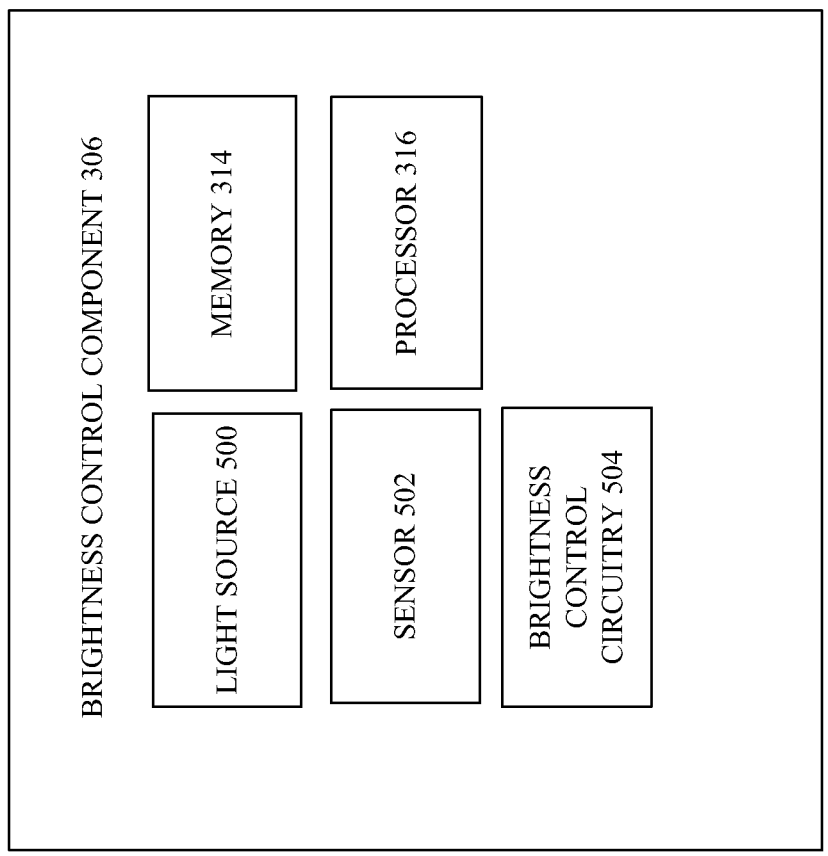
FIG. 5 is an illustration of a non-limiting exemplary brightness control component of the display device of FIG. 3 facilitating mobile advertising in accordance with embodiments described herein.

FIG. 5 is an illustration of a non-limiting exemplary brightness control component of the display device of FIG. 3 facilitating mobile advertising in accordance with embodiments described herein. Repetitive description of like elements employed in other embodiments described herein is omitted for sake of brevity.

The brightness control component 306 can include the light source 500, sensor 502, brightness control circuitry 504, memory 314 and/or processor 316. In various embodiments, one or more of the light source 500, sensor 502, brightness control circuitry 504, memory 514 and/or processor can be electrically and/or communicatively coupled to one another to perform one or more functions of the brightness control circuitry 306.

The light source 500 can include one or more light emitting diodes (LEDs) that can be turned on/off. In some embodiments, the light source 500 can be controlled such that one or more LEDs are turned on or off by the brightness control circuitry 504 to control the brightness and/or glare of the electronic advertising content displayed by the display device 102.

In some embodiments, the brightness control circuitry 504 can include one or more switches that can control whether one or more of the LEDs or other light sources are turned on (or the level of brightness of the display of the display device 102). For example, the switch can be turned on for daytime use and turned off for nighttime use. In some embodiments, a first switch option can be provided for daytime use and a second switch option can be provided for nighttime use. By way of example, but not limitation, there could be 12 banks of LEDs illuminated and a lesser number of banks (e.g., six banks) of LEDs used for nighttime.

In some embodiments, the sensor 502 can be provided that can detect sunlight and the switch option can be adjusted to adjust level of brightness based on the detected light. The level of brightness can then be adjusted, which can also address and/or reduce glare. Modifying the brightness (e.g., brightening or dimming the display of the electronic advertising content) can be provided in these embodiments.

In some embodiments, the brightness control circuitry 504 can include circuitry that can measure the amount of sunlight and/or brightness incident on one or more portions of the display device 102. The brightness control circuitry 504 can determine whether the amount of sunlight and/or brightness is above or below a defined threshold and/or dim or lighten the display of the colors of the electronic advertising content.

In some embodiments, the brightness control circuitry 504 can selectively turn on/off certain light emitting diodes located at positions that can illuminate dark areas of the displayed electronic advertising content in some embodiments. For example, the illumination can be synchronized to the specific time of display of particular electronic advertising content. In some embodiments, the illumination of selected sections of the electronic advertising content can be provided as a function of the content and as a function of how much sunlight is detected on the display device (and therefore whether the environment in which the display device 102 is located is indicative of nighttime or daytime environment).

Figure 6:
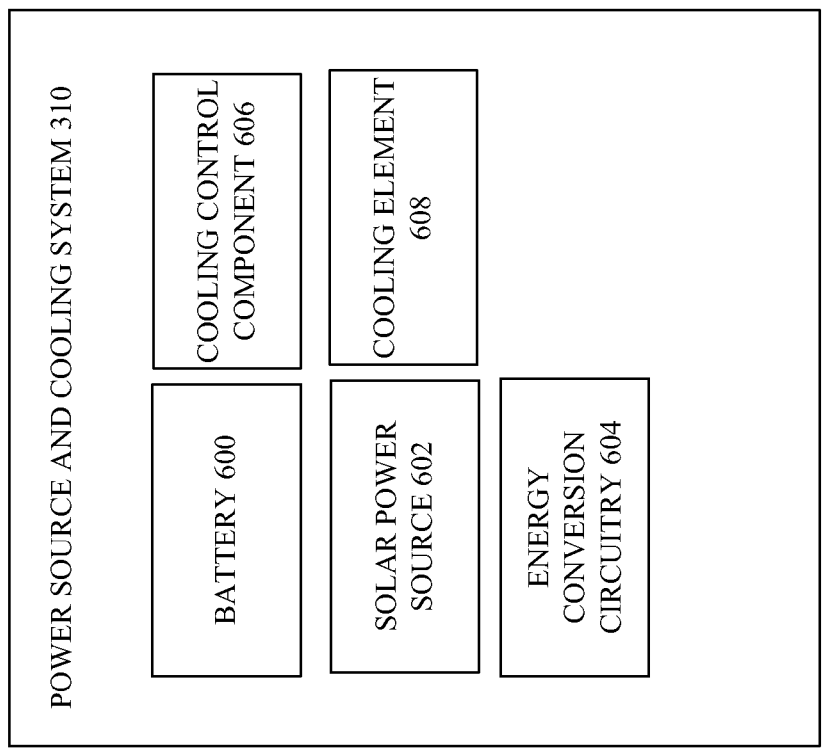
FIG. 6 is an illustration of a non-limiting exemplary power source and cooling system of the display device of FIG. 3 facilitating mobile advertising in accordance with embodiments described herein.

FIG. 6 is an illustration of a non-limiting exemplary power source and cooling system of the display device of FIG. 3 facilitating mobile advertising in accordance with embodiments described herein. Repetitive description of like elements employed in other embodiments described herein is omitted for sake of brevity.

Power source and cooling system 310 can include the battery 600, solar energy collector 602, energy conversion circuitry 604, cooling control component 606, cooling element 608 and/or measuring circuitry 610. In various embodiments, one or more of the battery 600, solar energy collector 602, energy conversion circuitry 604, cooling control component 606, cooling element 608 and/or measuring circuitry 610 can be electrically and/or communicatively coupled to one another to perform one or more functions of the power source and cooling system 310.

The battery 600 can be any number of different types of batteries that can power the display device 102. The battery 600 can be a re-chargeable battery in some embodiments. The battery 600 can be lithium or lithium-ion batteries in various embodiments.

The solar energy collector 602 can be any number of different collectors of solar energy. By way of example, but not limitation, the solar energy collector 602 can be a solar power film and/or one or more solar cells that can collect solar energy. For example, the solar energy collector 602 can be placed on the surface of the display device 102.

In one embodiment, the solar power film (or some other collector of solar energy) can be coupled to a device (e.g., energy conversion circuitry 604) that can convert the solar energy to electric energy that can be employed by the display device 102 for power during operation of the display device. In some embodiments, the solar film can be placed over the surface of the display device 102 and can collect solar energy that can be provided to the display device.

In either embodiment, solar energy collector 602 can be utilized to harvest solar energy during the day and the energy harvested can be employed to operate the display device 102 at night. While solar power is described, other different types of portable energy sources are also envisaged for use with the display device 102.

In some embodiments, when the battery 600 is a re-chargeable battery, the display device 102 can also include a charger electrically coupleable between the battery 600 and an electrical outlet or power source in the environment in which the display device 102 is located.

In some embodiments, the cooling element 608 can be located within the display device 102 and can be positioned substantially adjacent for the battery 600 (or at least within proximity of the battery 600 to allow cooling of the battery 600). In some embodiments, the cooling element 608 can be coil or other tubing configured to allow cooling fluid (e.g., refrigerant) to pass through the cooling element 608. The cooling element 608 is disposed to maintain cooling fluid and a combination of the cooling element 608 and the cooling fluid disposed in the cooling element 608 is configured to reduce the temperature of the battery 600. In some embodiments, the cooling element and/or cooling fluid can be positioned adjacent or in proximity to the computer processor (e.g., processor 316) of the display device 102 to cool such processor and potentially extend the life and/or functionality of the processor 316.

In some embodiments, measuring circuitry 610 can measure the temperature of the battery 600 and/or the processor 316 and/or exhibit defined circuit behavior or output a particular signal when temperature in excess of a particular value is detected/measured. In response to the measured temperature or circuit behavior or particular signal, the cooling control component 606 can activate a pump (not shown) in display device 102 that pumps the cooling fluid into and/or through at least a portion of the cooling element 608 to cool the battery 608, processor 316 or other component of the display device 102. In some embodiments, the cooling control component 606 can, by default and/or based on any number of conditions (e.g., by schedule, time of day, etc.), cause the pump to move the cooling fluid into or through the cooling element 608. The cooling control component 606 can be programmed to change operation from time to time (changing the activating temperature, schedule of on/off pumping).

Figure 7:
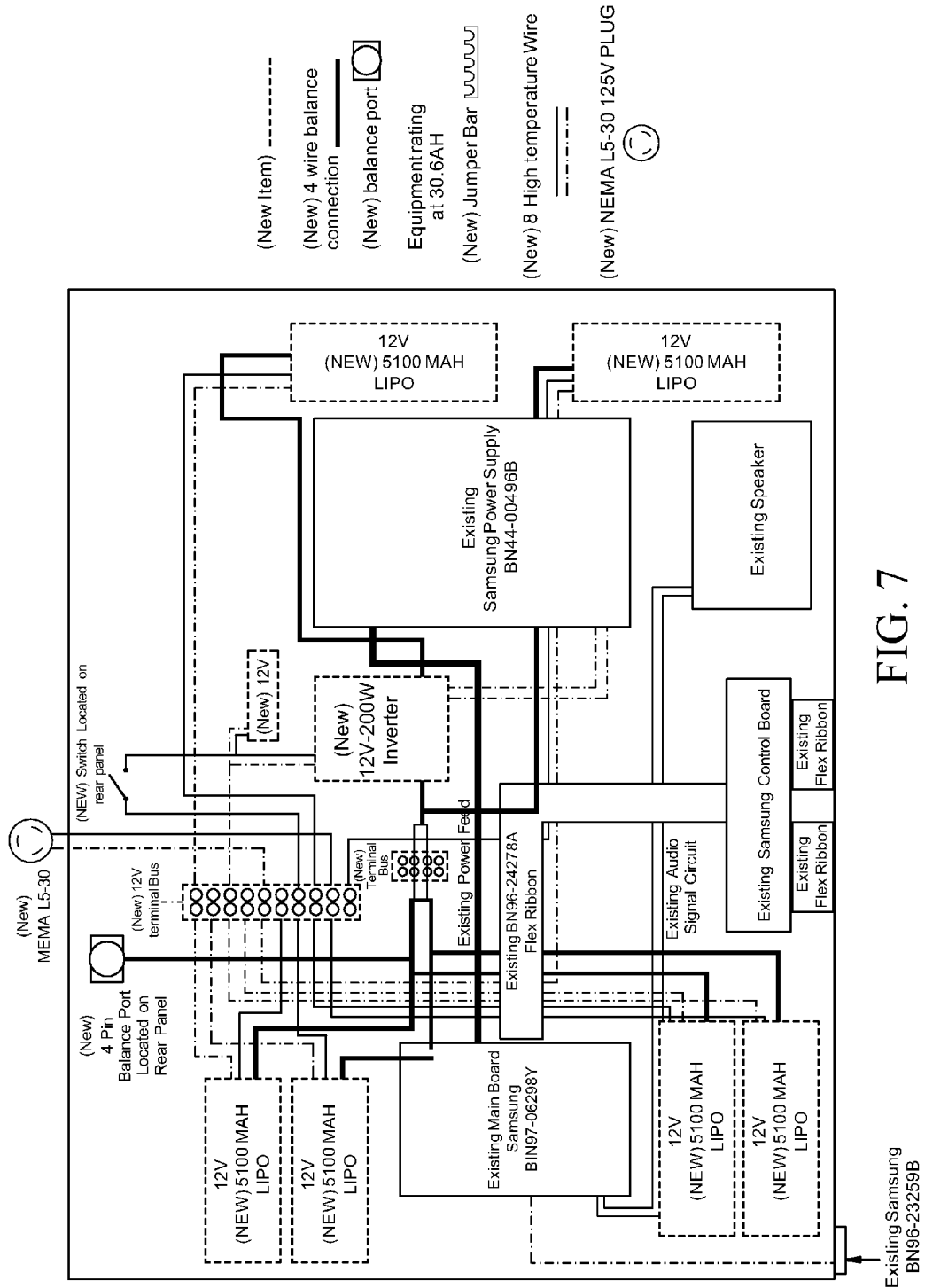
FIG. 7 is an illustration of non-limiting exemplary circuitry of the display device of FIG. 3 facilitating mobile advertising in accordance with embodiments described herein.
Figure 8:
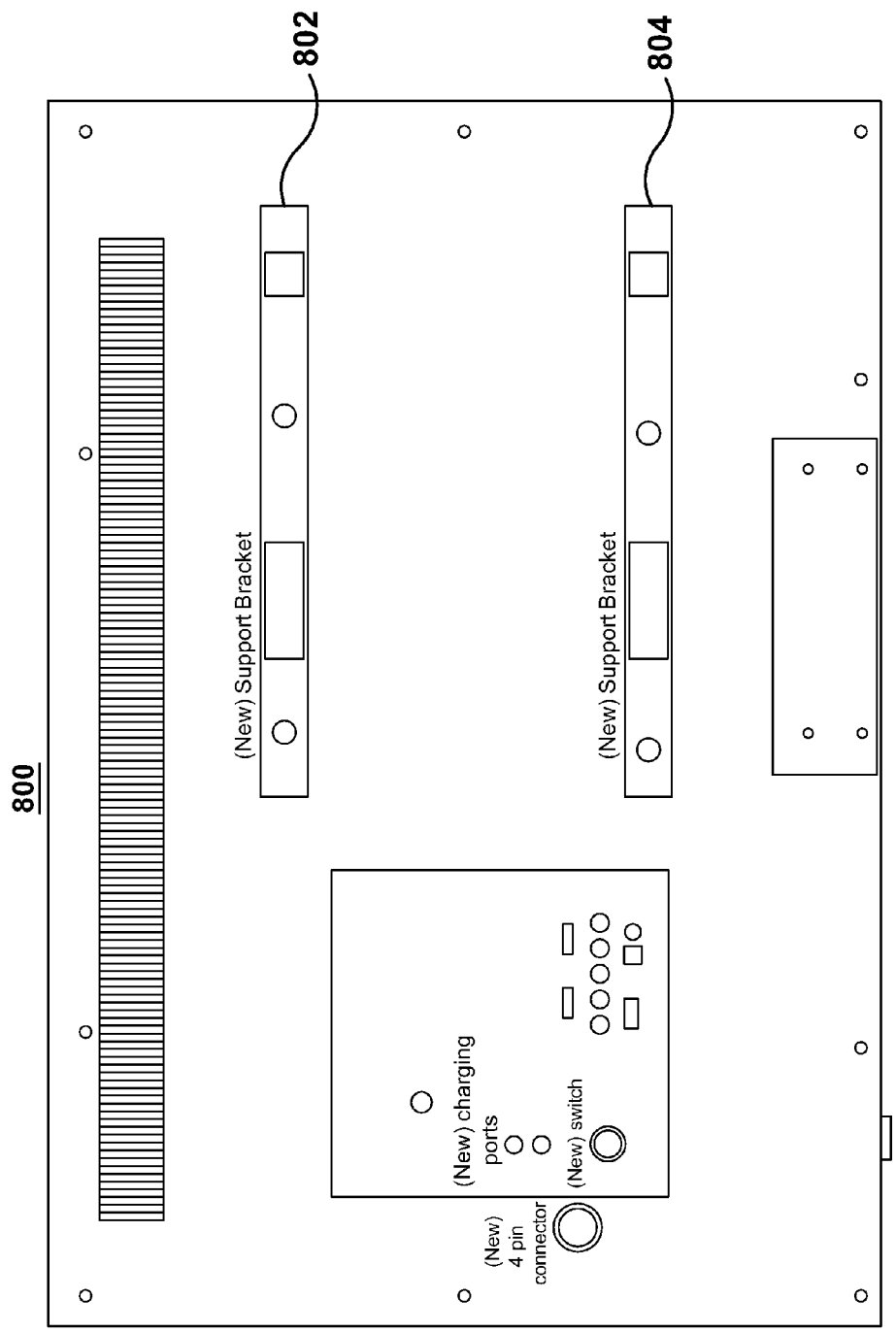
FIG. 8 is an illustration of a non-limiting exemplary rear panel for a display device of FIG. 3 facilitating mobile advertising in accordance with embodiments described herein.
Figure 9:
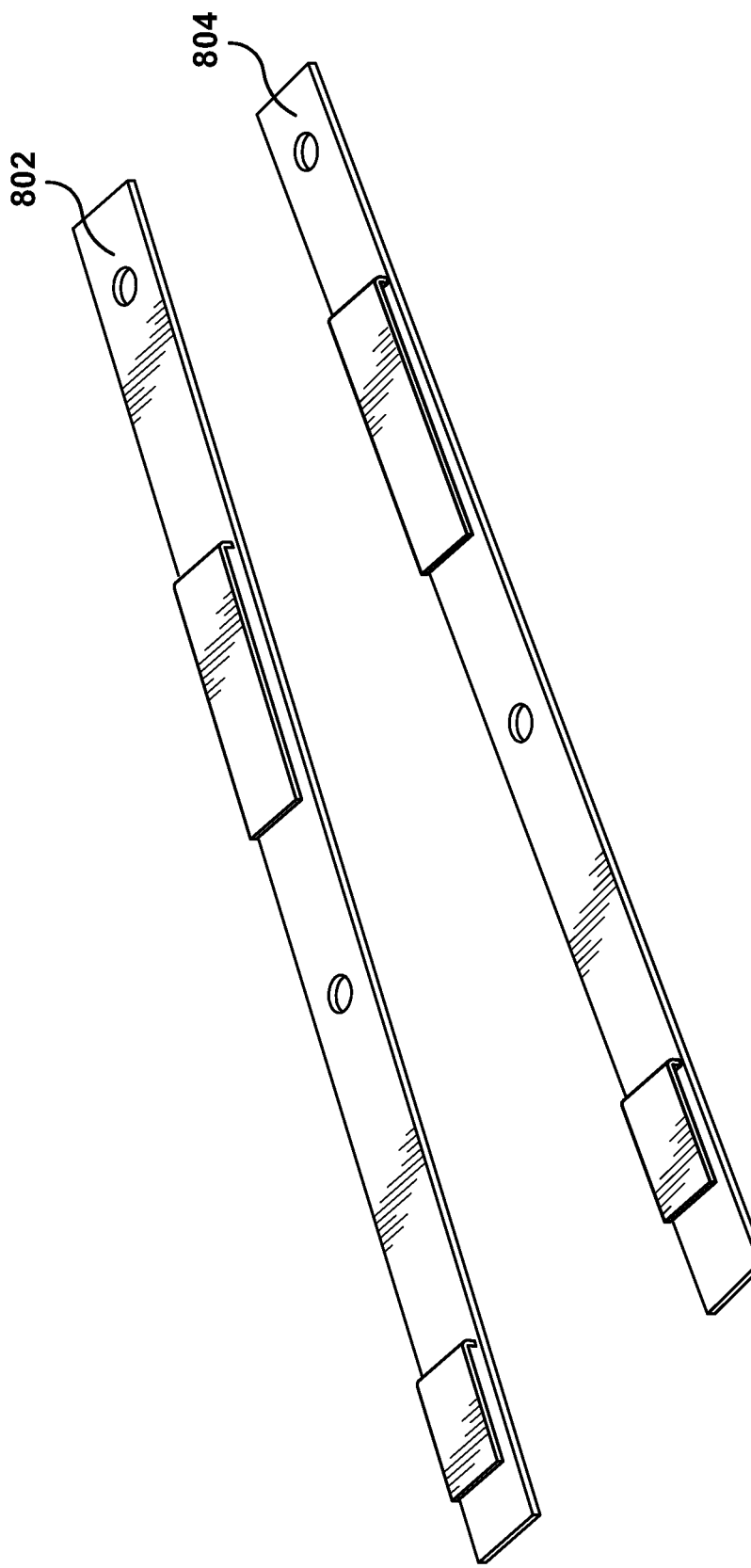
FIG. 9 is an illustration of non-limiting exemplary brackets for support of the display device of FIG. 3 facilitating mobile advertising in accordance with embodiments described herein.
Figure 10:
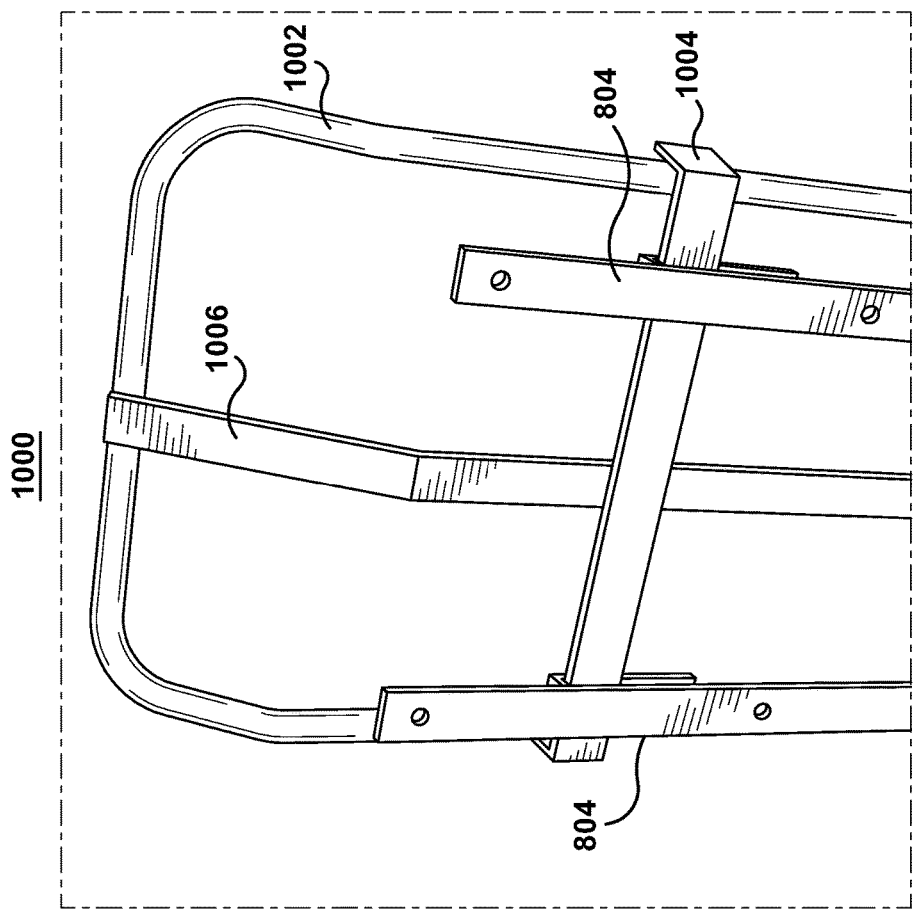
FIG. 10 is an illustration of a non-limiting exemplary frame, bracket and strap assembly that facilitates mobile advertising in accordance with embodiments described herein.

FIG. 7 is an illustration of non-limiting exemplary circuitry of the display device of FIG. 3 facilitating mobile advertising in accordance with embodiments described herein. FIG. 8 is an illustration of a non-limiting exemplary rear panel for a display device of FIG. 3 facilitating mobile advertising in accordance with embodiments described herein. FIG. 9 is an illustration of non-limiting exemplary brackets for support of the display device of FIG. 3 facilitating mobile advertising in accordance with embodiments described herein. FIG. 10 is an illustration of a non-limiting exemplary frame, bracket and strap assembly that facilitates mobile advertising in accordance with embodiments described herein.

With reference variously to FIGS. 7, 8, 9, 10, 11A, 11B and 11C, one or more embodiments of the display device, system (and components of the system) will be described. The display device 102 includes a device configured to display video content or still images. The display device 102 includes a plurality of batteries connected to one another to provide for portable operation of the display device. For example, in one embodiment, a display device 102 is configured to include a power source that allows for operation of the display device 102 and corresponding playback/display of advertising content for a defined amount of time.

For example, the power source can be a composite of a number of batteries coupled in parallel and connected to an inverter of a display device 102 to provide extended power for several constant hours of display. In one embodiment, the display devices 102, 104 are internally powered and can remain powered for 11-12 hours at any particular time.

In one embodiment, the display device 102 is a Samsung UN39FH5000 device modified to make the display device 102 battery-operated and portable. In some embodiments, the 5100 milliamp hour (mah) 12 volt lithium batteries are used in combination of series and parallel circuitry to generate 12 volts and 36 amps of usable energy to facilitate 7-10 hours of running time of the display device 102. To convert the display device 102 into a battery-operated device, in one embodiment, a plurality (e.g., six or seven) of 12.6 volt 5100 milliamp lithium ion polymer (LIPO) batteries are connected in parallel to enable the batteries to provide an ampacity of approximately 30.6 milliamps. The display device 102 in which the batteries are located can draw approximately 2.5 amps per hour, which can provide approximately 9.5 hours of display device 102 operation time at a power factor of approximately 80%. The batteries can be electrically coupled to a 200 watt existing inverter to achieve the voltage and amperages for efficiently providing a long-lasting, lightweight display device 102 efficient for mobile advertising use.

In the embodiment described and shown in FIG. 7, the dotted boxes represent new components. The inverter is electrically coupled to the switch located on the rear panel, and is electrically coupled to the busbar. The inverter can provide power to the power supply, which is composed of the above-described batteries (the plurality of 12.6 volt 5100 milliamp LIPO batteries shown and described above with reference to FIG. 7) coupled in parallel. In some embodiments, the inverter is a 12 volt 200 watt inverter used to convert 12 volts to 120 volts to the Samsung BN44-00666A or BN44-00496B power supplies (or to another power supply having one or more comparable specifications to those of the Samsung BN44-00666A or BN44-00496B power supplies).

A four balance wire connection is provided in the circuitry as shown because the LIPO batteries can otherwise burn out during charging of the display device. Accordingly, the four wires shown serve as control wires to allow for the use of a high temperature wire because approximately 30 amperes is moving through the wire in approximately 40 minutes charging time. In some embodiments, the four balance wire connection is used to monitor the LIPO batteries while the batteries are charging to prevent excessive energy build up. The four balance wire can also be used to send signals back to the charging unit processor in the event of excessive energy or unbalanced charging or dispersal. The National Electrical Manufacturers Association (NEMA) LR3 is rated at 30 amps.

The balance port can be used as a female attachment that is connected to the male attachment while in the state of charging to notify a separate charging system error in the system. The balance port can also be used to prevent the LIPO batteries from excessive charge and prevention of explosion. The jumper bar can be used in connection with a terminal bus to create a parallel bus on the terminal strip. Both positive and negative leads are provided.

The #8 high temperature wire provides positive and negative leads. The nema L5-30 125 volt plug can be used to collect and distribute energy into the LIPO batteries.

While one mere embodiment is described employing a Samsung device in other embodiments, the display devices 102, 104 are generally portable display devices 102, 104 that playback video content and have an internal power source. Accordingly, any number of different devices can be created without resort to any particular existing device.

To convert the display device 102 into a portable device, brackets can be coupled to the panel of the display device, and a frame for transport of the display device 102 can be coupled to the brackets to form a system. For example, the brackets can be attached to the rear panel of the display device 102 (or the side of the display device 102 opposing or other than the side of the display device 102 having the display region). The frame can include one or more straps or other mechanisms for attaching the frame to the transport mechanism (e.g., human carrier, automated machine or the like).

In one non-limiting, exemplary embodiment, two 4 inch angle pieces of metal are welded onto two steel brackets that measure ¼ inch by 1 inch by 18 inches. In some embodiments, the brackets can be positioned approximately 4 inches from the top and approximately 13 inches to a secondary hook of the bracket. This assembly is then bolted onto the side of the display device 102 opposing the side of the display device 102 with the display region with four 1 inch by 22 millimeter bolts. An existing military grade Alice Frame/A-Frame can be affixed to the assembly by sliding onto the angle pieces to lock the Alice Frame/A-Frame in place. Once the Alice Frame/A-Frame, bracket and display device 102 are joined, the display device 102 can be strapped onto a carrier (e.g., human carrier) of the display device 102 or an automated machine with one or more straps. In either embodiment, the display of the advertising content can then be provided. In other embodiments, any frame other than an Alice Frame/A-Frame that can be coupled to the display device 102 for support and transport of the display device 102 can be employed.

Figure 11B:
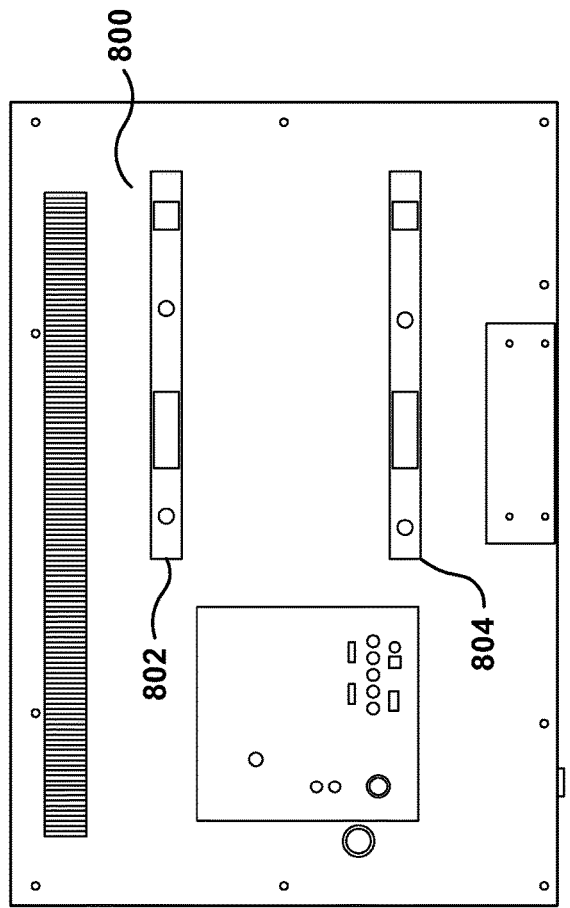
FIGS. 11A, 11B and 11C are illustrations of non-limiting exemplary components of display assemblies that facilitate mobile advertising in accordance with embodiments described herein.
Figure 11C:
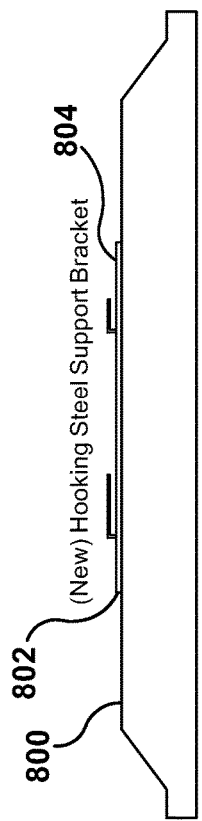
Figure 11A:
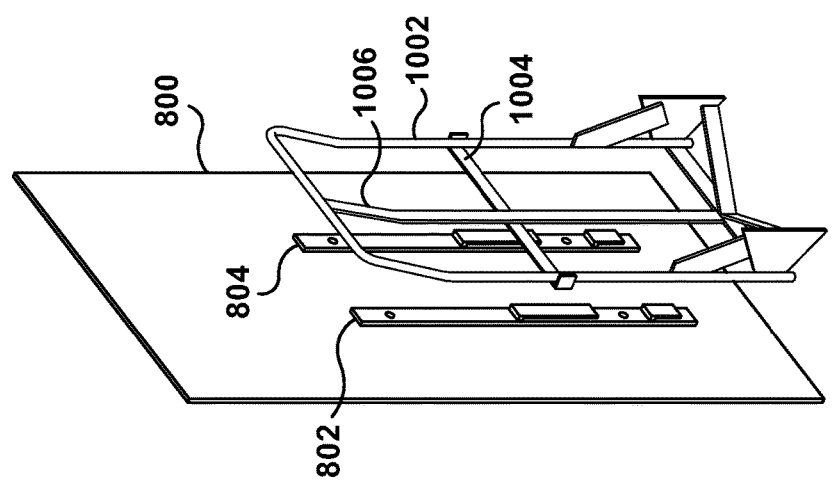

FIGS. 11A, 11B and 11C are illustrations of non-limiting exemplary components of display assemblies that facilitate mobile advertising in accordance with embodiments described herein. Repetitive description of like elements employed in other embodiments described herein is omitted for sake of brevity. The drawings show different components of the assembly including the display device 102 (rear 800 of the display device 102 is shown), brackets 802, 804 that interlock with the support structure 1002 having bars 1004, 1006 for supporting the brackets 802, 804 and having belts (not shown) that serve as a brace to allow a wearer of the assembly to strap the display device and support structure 1002 to his/her back or to a stable structure.

FIGS. 12A, 12B are illustrations of bottom and side views of non-limiting exemplary display devices that facilitate mobile advertising in accordance with embodiments described herein. Repetitive description of like elements employed in other embodiments described herein is omitted for sake of brevity.

In some embodiments, a system 1200 includes a support structure 1206 coupled to the display device 104. The support structure can be coupled to the display device 104 at least one location of the support structure 1206 and configured as a handle or latch to facilitate holding or maintaining a position of the display device 104. For example, in some embodiments, the support structure 1206 can be pivotally attached, hingedly attached and/or swivel-attached to the latch 1208. The latch 1208 can be coupled to one or more of the brackets 802, 804 in some embodiments.

In some embodiments, the support structure 1206 is disposed to hold a bottom display device 104 in a stationary position to provide a self-supporting display device. The supported display device 104 can then support other display devices (e.g., display device 102) being stacked on the bottom display device 104. In one embodiment, the support structure 1206 can be configured as a hingedly connected or swivelable bar or rod (e.g., kickstand) attached to the display device 104 (e.g., attached to the rear panel of the display device 104). In one embodiment, the support structure 1206 is removable from the display device 102 and can couple to a component (latch or hook or embedded region in or on the surface of the display device).

In some embodiments, the support structure 1206 can be provided on a top surface of the display device 102 that is configured to be positioned as a bottom display device 104 and can connect to a display device 102 positioned on top of the bottom display device 104. In another embodiment, the support structure 1206 can be provided on a side of a display device 102 to interlock with or couple to another display device 102 on the side of the display device 102. The display devices 102, 104 can be temporarily interlocked and then unlocked for re-arrangement of the display devices 102, 104 or disassembling the set of display devices 102, 104. The display device 102 can include an interlock two or more display devices 102, 104 together. For example, a latch (not shown) can be included as part of the display device 102 and can connect two or more display devices 102, 104 together. For example, the top of the bottom display device 104 and bottom of the top display device 102 can be latched together with a latch on one or both of the display devices 102, 104. In some embodiments, the latch or any other interlocking mechanism can be provided on any side or surface of one or more of the display devices 102, 104.

In some embodiments, the support structure 1206 can be formed as a kickstand device to allow the display device 102 to be self-supporting when positioned on the ground/floor. A handle 1202 can be provided on the display device 102 to allow the display device 102 to be held and/or moved by an operator of the display device 102. In various embodiments, one or more or each of the display devices (e.g., display devices 102, 104) can include a handle 1202. In some embodiments, the support structure 1206 is removable. In some embodiments, the support structure 1206 is hinged or moveable to a position leaning against the ground or another surface to support the display device 102 to which the support structure 1206 is attached.

FIGS. 13A and 13B are illustrations of front and side views of a non-limiting exemplary display device 102 with a visor that facilitates mobile advertising in accordance with embodiments described herein. FIG. 13C is an illustration of a side view of stacked non-limiting exemplary display devices 102, 104 with visors that facilitate mobile advertising in accordance with embodiments described herein. Repetitive description of like elements employed in other embodiments described herein is omitted for sake of brevity.

A visor could be a flap that can fold forward or fold backward. In some embodiments, a display device 102 can include a visor that can be provided along an edge of the display device. The visor can provide shade on at least some part of the display device 102 by extends beyond the surface of the device. The visor can be attached to the side in some embodiments. The visor can extend approximately 12 inches or approximately 6 inches past the top of the display device. The visor can be or include any number of materials that can filter or reduce the amount of direct sunlight on the display device.

The visor can be composed of plastic, polycarbonate or any number of different opaque, translucent, tinting or filtering materials. In some embodiments, the visor can be black or other color that impedes sunlight from passing through the visor. The visor can be cloth in some embodiments or covered in source. In some embodiments, the visor can be or include a polarized lens.

Figure 13D:
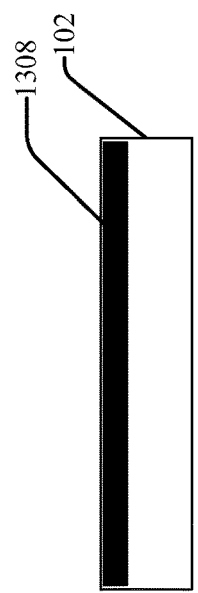
FIG. 13D is an illustration of a non-limiting exemplary visor having hook and loop fabric on a portion of the surface of the visor for attachment of the visor to the display device that facilitates mobile advertising in accordance with embodiments described herein.
Figure 13E:
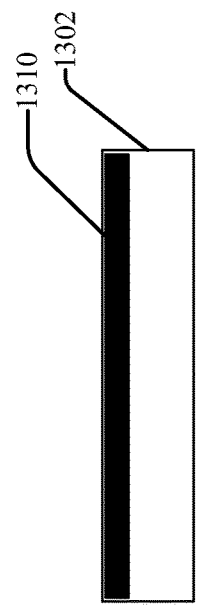
FIG. 13E is an illustration of a non-limiting exemplary display device having hook and loop fabric on a portion of the surface of the display device for attachment of the display device to the visor that facilitates mobile advertising in accordance with embodiments described herein.

FIG. 13C is an illustration of a side view of stacked non-limiting exemplary display devices 102, 104 with visors that facilitate mobile advertising in accordance with embodiments described herein. FIG. 13D is an illustration of a non-limiting exemplary visor having hook and loop fabric on a portion of the surface of the visor for attachment of the visor to the display device 102 that facilitates mobile advertising in accordance with embodiments described herein. Repetitive description of like elements employed in other embodiments described herein is omitted for sake of brevity.

The visor 1302 can be a removable flap that can be folded forward or backward in some embodiments. For example, a Velcro strip can be provided on the display device 102 and/or the visor. The visor 1302 can be removable and/or attachable to the display device 102 in any number of ways including, but not limited to, Velcro or other hook and look fastener on the display device 102 and visor 1302. On surface 1306, the visor can include Velcro hooks that complement and attach to the Velcro loops (or vice versa). For example, as shown in FIG. 13D, display device 102 can include a hook and look fastener fabric 1308 on a first region of a top of the display device 102 and the visor 1302 can include a hook and loop fastener fabric 1310 on a first region of the surface of the visor 1302. The hook and loop fastener fabric 1308 can be Velcro hook for example and the hook and loop fastener fabric 1310 can be Velcro loop for example (or vice versa).

The Velcro could be on the top surface of the visor when the display devices 102, 104 are stacked so the display devices 102, 104 can attach to one another.

As such, the visor can be moveable. When operating a single display device, the visor can be able to be folded forward to cast shadow on and thereby possibly increase cooling of the display device. In embodiments in which the display device will be used as a bottom display device on which another display device is stacked, the visor for the bottom display device can fold backward to avoid the visor hampering the appearance of any tiling of electronic advertising content across the multiple display devices 102, 104.

Different visors can be configured differently depending on the specific display device with which the visor is to employed (and/or whether the visor is being employed with a display device 102 on the bottom of a tiling arrangement (e.g., FIG. 18), a display device 102 used in isolation, a display device 102 used in conjunction with other display devices 102, 104 but not tiled or the like (e.g., FIGS. 15, 16, 17)).

In some embodiments, one or more surfaces 1304, 1306 of the visor can include Velcro fabric or another fabric (hook and loop or otherwise). For example, in one embodiment, one or more visors 1302 employed on the one or more display devices 102, 104 can include a first surface 1306 that includes Velcro on a single side such that when multiple display devices 102, 104 are used, the visor 1302 on the bottom display device 104 can be folded backward.

While the visor is described as being attachable to the display device 102 employing Velcro hook and loop fasteners, any type of fastener or method of attaching/fastening the visor to the display device 102 can be employed in other embodiments. For example, anchors, clamps, etc. can be employed on the display device 102 and/or the visor to serve as mechanical fasteners that attach the display device 102 and the visor. In some embodiments, where feasible (long-term use of the visors), adhesives can be employed to couple the visors to the display devices 102, 104. In some embodiments, the visor can be coupled to a clamp that can removably clamp to and attach to the display device 102 to hold the visor in place during use. All such embodiments are envisaged.

In some embodiments, the display device 102 can include a slot in which the visor can slide for temporarily affixing the visor to an edge of the display device.

In various embodiments, the display device 102 can include slots or Velcro fabric on any number of different edges or surfaces of the display device. For example, in one embodiment, the slot and/or Velcro surfaces can be on a top edge of the display device. As another example, the slot and/or Velcro surfaces can be on a side edge and/or surface of the display device. The visor can be flexibly applied to the display device 102 at different locations depending on the need for shading and/or blocking the sun and thus can change from time to time based on the location of the sun relative to the location of the display device 102 in operation.

Figure 14B:
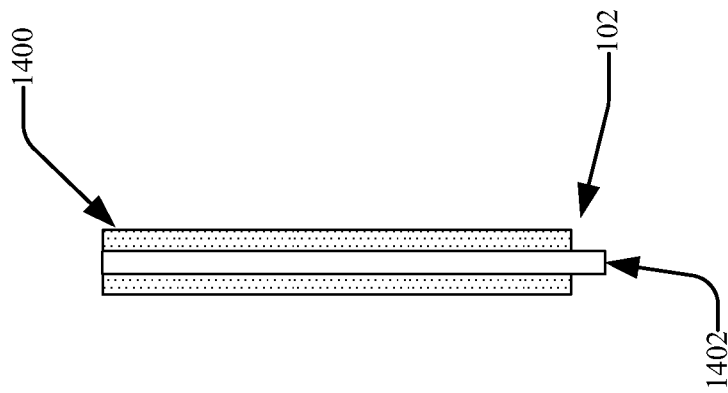
FIGS. 14A and 14B are illustrations of front and side views of a non-limiting exemplary display device with film that facilitates mobile advertising in accordance with embodiments described herein.
Figure 14A:
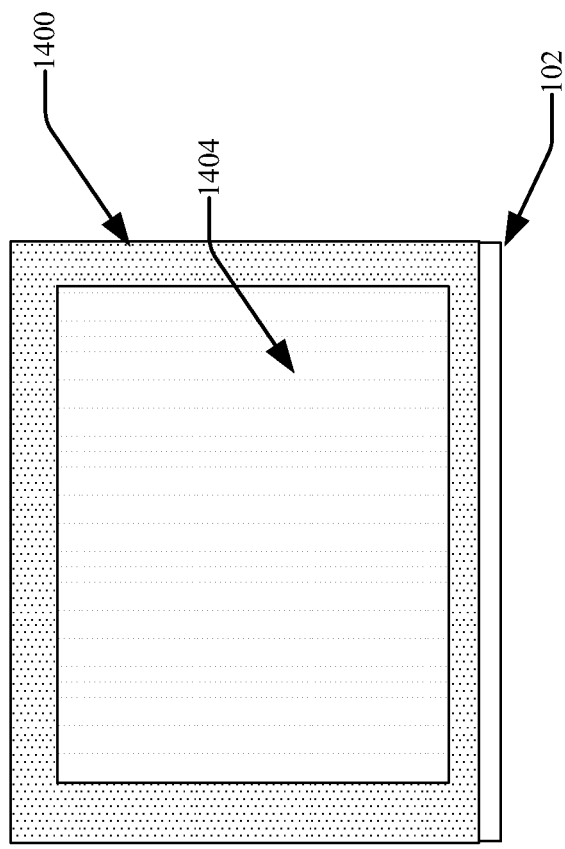

FIGS. 14A and 14B are illustrations of front and side views of a non-limiting exemplary display device with film that facilitates mobile advertising in accordance with embodiments described herein. Repetitive description of like elements employed in other embodiments described herein is omitted for sake of brevity.

In one embodiment, a first film (e.g., film 1400) is disposed on one or more surfaces of the display device 102 and bearing one or more advertising messages. The display device 102 vents heat through a portion 1402 of the display device 102 on which the first film 1400 does not cover. A second film 1404 is disposed on a display region of the first film 1400. In some embodiments, the second film 1404 is substantially transparent to facilitate display of the electronic advertising content from the display device 102.

The display devices 102, 104 can be individually wrapped with a film 1400 (e.g., advertisement of the company logo) to protect from adverse weather condition (e.g., so the film can be waterproof in some embodiments). A clear film 1404 can be provided over the display region (e.g., screen) of the display device 102. The display device 102 can be wrapped and be completely enclosed except for the area 1402 where the vents are located at the bottom of the display device 102.

In one embodiment, a system can include the system can include a film placed over one or more portions of the system. The film can cover each surface of the system except one side or portion of the system to allow for venting. In one embodiment, each surface of the system except the bottom surface will be covered and venting can be provided from the bottom of the system. In other embodiments, any number of other areas, regions of the system can remain uncovered without the film to allow for venting at the uncovered location. In some embodiments, the film can be vehicle wrap film applied to the surface of the system and can be film with or without wording or graphics to advertise or otherwise communicate information from the system. In some embodiments, the film can be or include vinyl graphics provided on a laminate material. Any number of materials is possible. The system can be wrapped with a film bearing color or graphics or text (but not covering the bottom or another area for venting) and, in some embodiments, a clear film can be placed over the film bearing the graphics or color or wording. In some embodiments, the wording or color or graphics can be provided on one or more portions of the system other than the portion on which the advertising content will be displayed. For example, the film can be displayed on the portions other than the display screen region of the system.

In some embodiments, the frequency of the signal can be boosted to combat the problems with interference. In areas with large crowds, since the wireless signal has trouble going through water and bodies are largely water. In some embodiments, the system could possibly boost the frequency but larger power requirement to result in greater signal strength. In some embodiments, a power circuit can boost the ability of the receiver to receive power in cases in which interference is above a defined threshold.

In terms of security, the display devices 102, 104 can be configured to operate with a security mechanism such that the display device 102 is only unlocked to receive incoming signals encoded with certain types of encryption and only displays the information that is encoded with the type of encryption expected. A hacker can broadcast on the same frequency and/or hijacking can be reduced.

Figure 15:
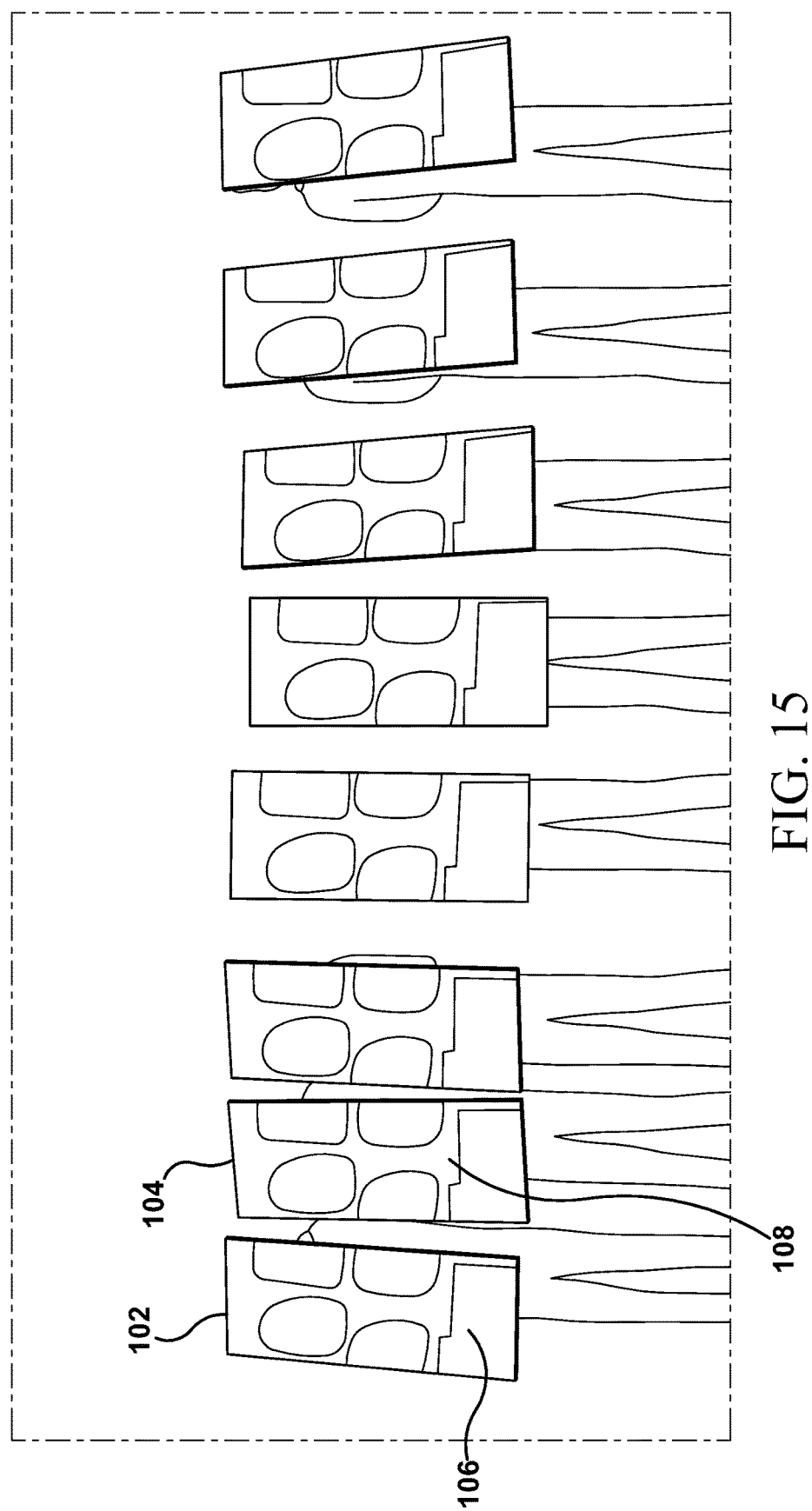
FIGS. 15, 16, 17, 18 and 19 are screenshots illustrating different configurations of display devices of FIG. 3 displaying mobile advertising in accordance with embodiments described herein.
Figure 16:
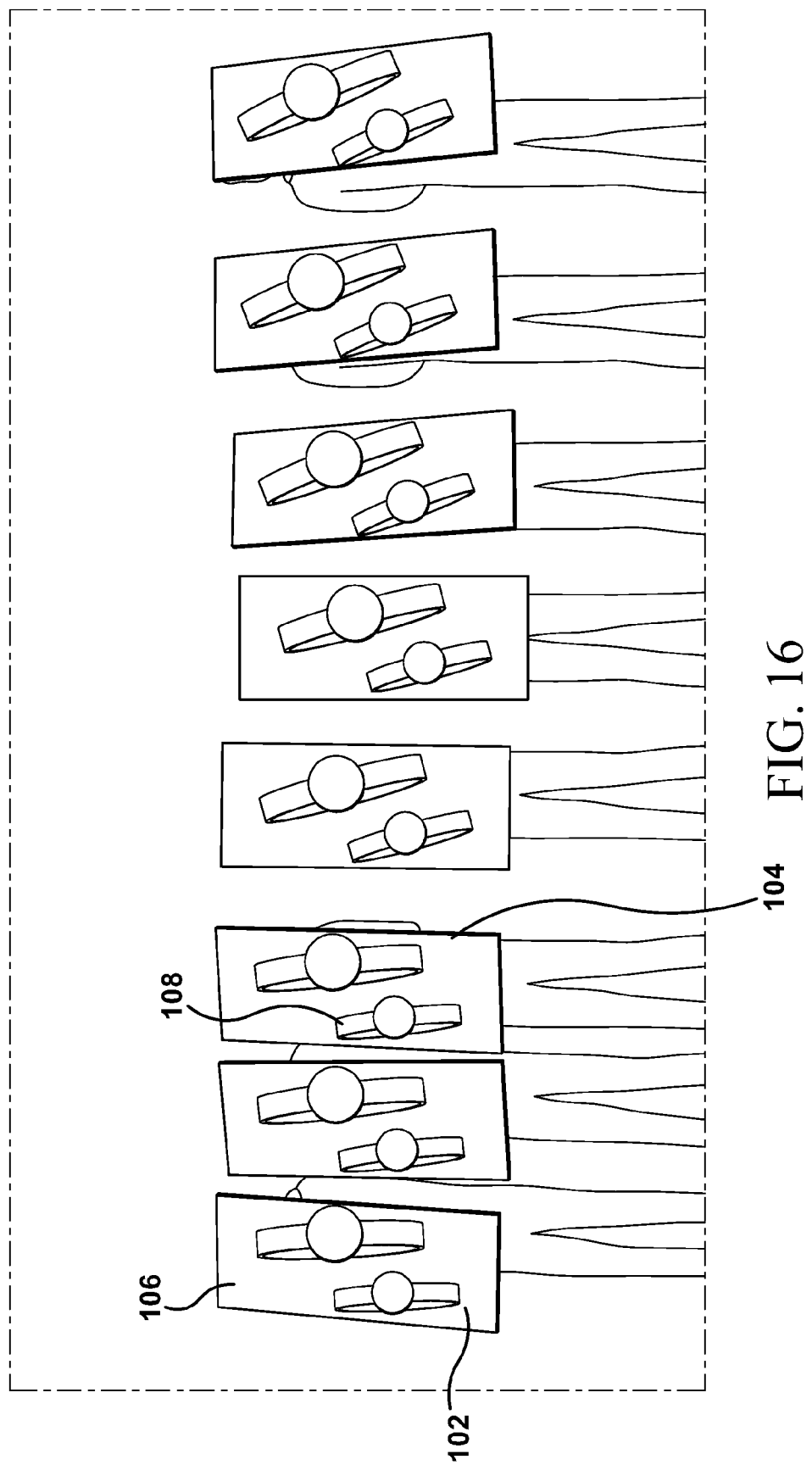
Figure 17:
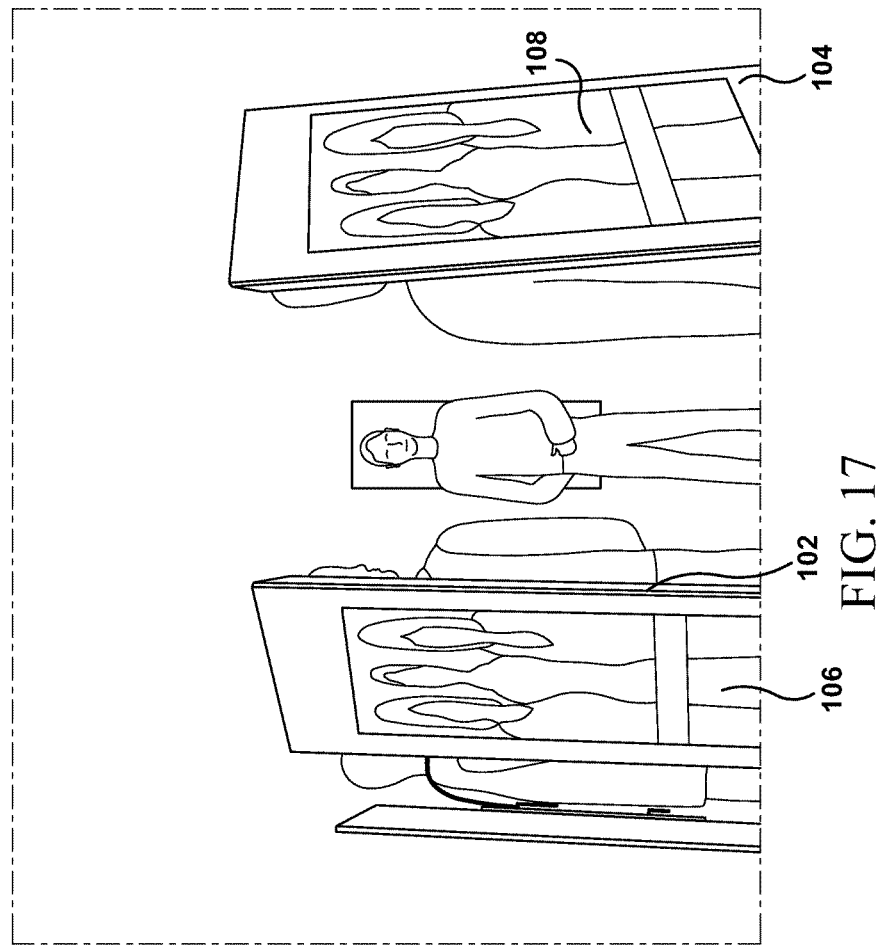
Figure 18:
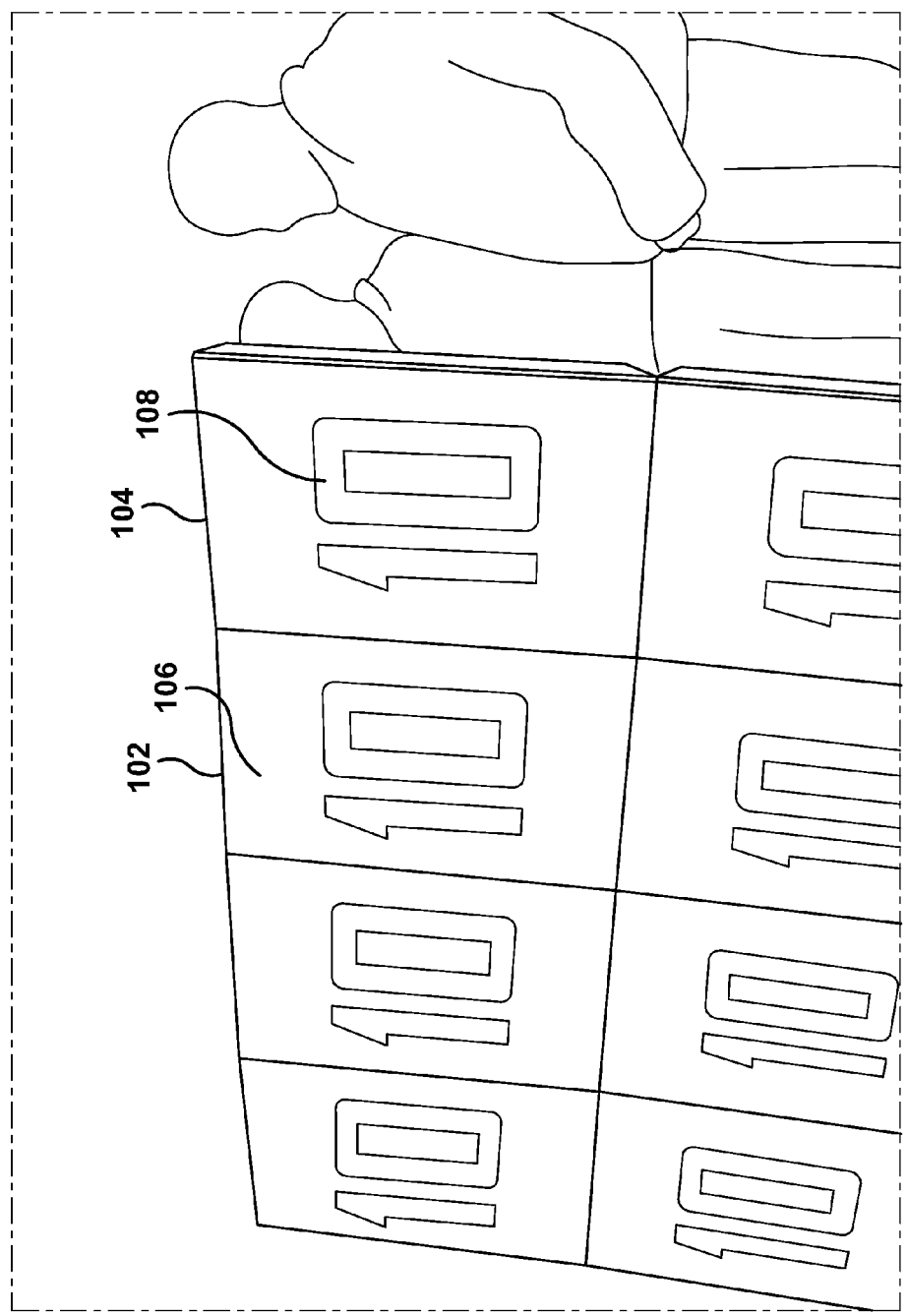
Figure 19:
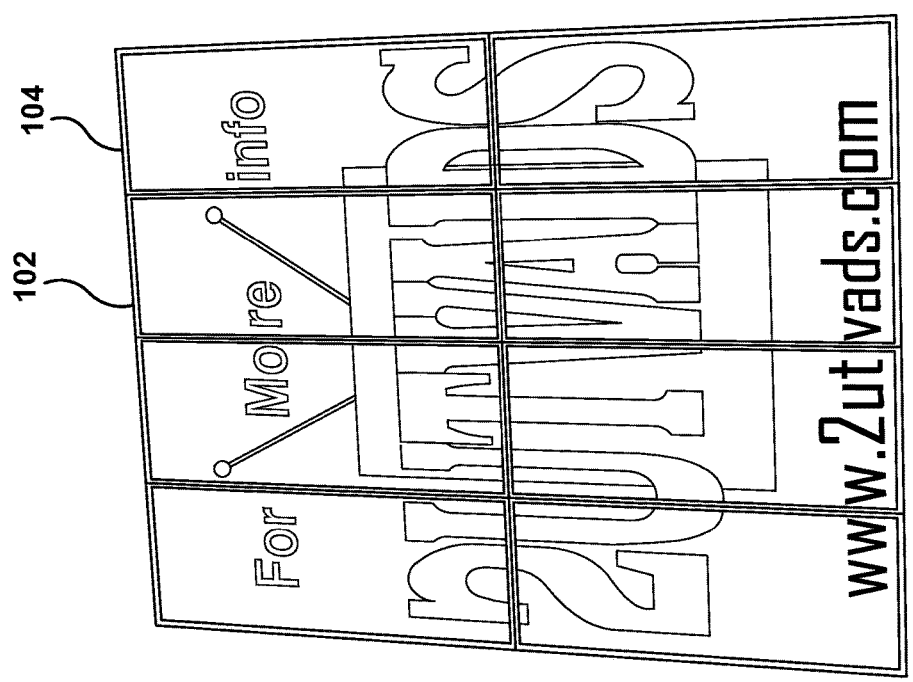

FIGS. 15, 16, 17, 18 and 19 are screenshots illustrating mobile advertising in accordance with embodiments described herein. As shown, FIGS. 15 and 16 illustrate screenshots of respective advertising messages displayed via horizontal alignment of display devices 102, 104 and synchronization and display of the same advertising content over the display devices 102, 104. FIG. 17 illustrates a screenshot of an advertising message displayed via a three-dimensional circular arrangement of advertising content. FIG. 18 illustrates a screenshot of a horizontal and vertical arrangement of advertising content to form an advertising message. FIG. 19 displays a screenshot of an advertising message composed of a composite of multiple portions of different advertising content spliced and displayed on different display devices 102, 104, and arranged to provide a single advertising message.

The screenshots show the embodiments described herein with human carriers; however, in other embodiments, automated machines can also be employed for transport and/or arrangement of the display devices 102, 104 to facilitate mobile advertising. For example, in some embodiments, automated machines can provide a support mechanism for transport of display devices 102, 104. The automated machines can be electrical and/or mechanical in nature in various embodiments. In some embodiments, the automated machines can also include one or more computer processors for performing transport and/or arrangement of the display devices 102, 104 in various embodiments.

The portable display devices 102, 104 can be arranged in different configurations to communicate the advertising content displayed from the display devices 102, 104, and can be located at different geographic locations from time to time. In one example, one or more of the display devices 102, 104 display different content and are positioned adjacent one another to display a single advertising message composed of respective advertising content displayed by the respective display devices 102, 104 relative. In another example, the display devices 102, 104 display the same advertising content on one or more (or each) of the display devices 102, 104.

In another embodiment, a system includes a first display device 102 configured to display first electronic advertising content; and a second display device 104 configured to display second electronic advertising content. The first display device 102 and the second display device 104 can be adjustably positioned in an arrangement relative to one another to display an advertising message, wherein the advertising message is composed of the first electronic advertising content and the second electronic advertising content, and wherein the first display device 102 and the second display device 104 are mobile devices.

In various embodiments, the display devices 102, 104 can be arranged in one or more configurations for different mobile advertising presentations and/or to communicate different advertising messages. For example, the configuration of the arrangement of the display devices 102, 104 can be a horizontal and/or vertical tiled configuration. As another example, the configuration of the arrangement of the display devices 102, 104 can be a three-dimensional circular arrangement in which the display devices 102, 104 form a circle (or substantial circle) with the display region of the display device 102 facing outward from the circle to provide for ease of viewing of the advertising message by bystanders. Numerous different configurations are possible and are envisaged herein.

In various embodiments, the arrangement and/or re-arrangement of the display devices 102, 104 can be performed based on a carrier or other transport mechanism transporting the display device 102 from one geographic location to another geographic location and/or moving a display device 102 to a defined position relative to the position of another display device. For example, carriers can transport the display devices 102, 104 on the back or front or other body surface of the carrier and move in a defined choreographed manner to provide a defined synchronized display of advertising content.

In one embodiment, the carrier and/or automated machine can transport the display devices 102, 104 to a geographic location of interest by arriving to the geographic location in a defined formation. The automated machines can transport the display devices 102, 104 and move in a defined choreographed manner pre-programmed into the machines to provide a defined synchronized display of advertising content.

For example, the formation can include movement in a defined choreographed (e.g., movement in a single file line or in a number of rows of lines or in a circular formation). Upon arrival at the geographic location of interest, the carriers and/or automated machines can arrange the display devices 102, 104 in a defined configuration for communication of the advertising message once the display devices 102, 104 display the respective advertising content. Accordingly, the configuration of the display device 102 can be based on any number of factors including, but not limited to, the eventual advertising message for display, the dimensions of the geographic location of interest in which the advertising display will occur, the expected bystander population, available lighting or any number of other factors.

Figure 20:
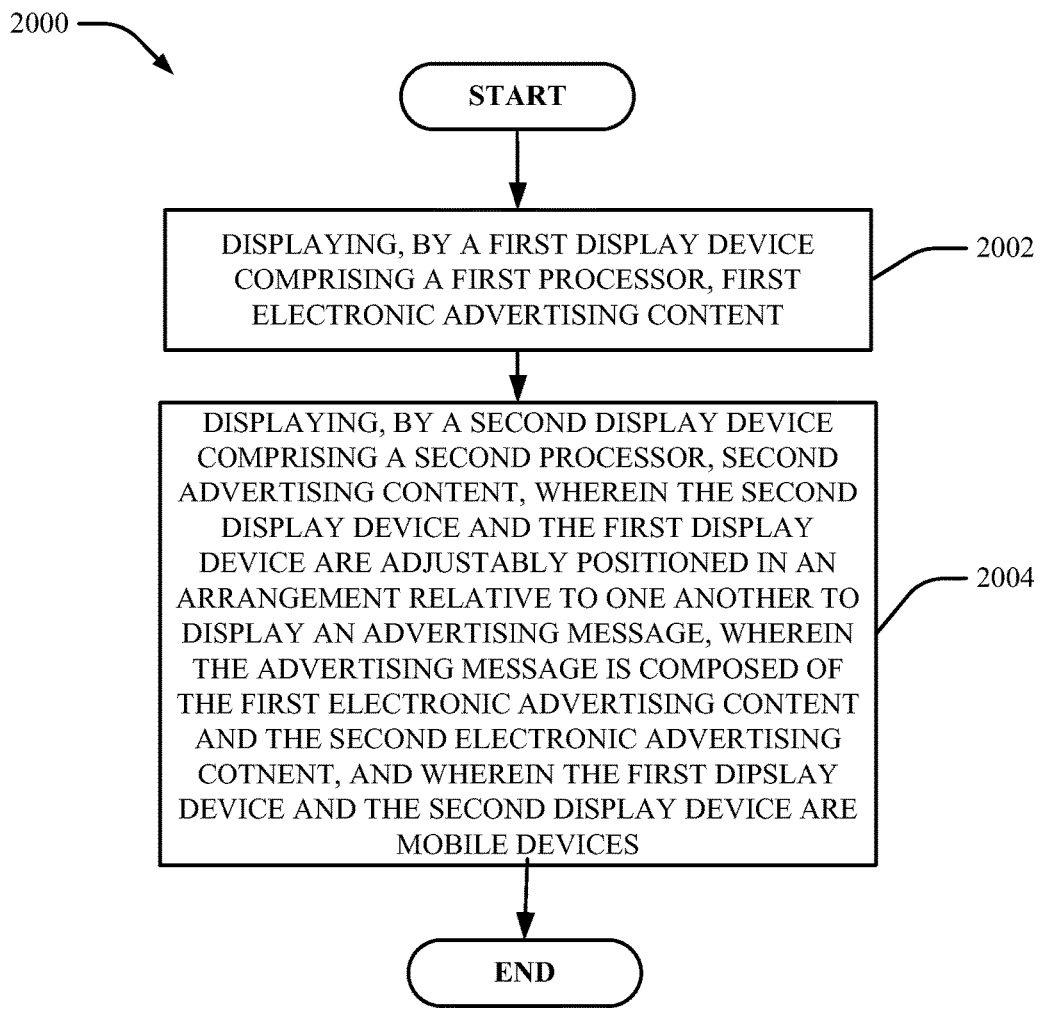
FIGS. 20, 21, 22 and 23 are flow diagrams of methods facilitating mobile advertising in accordance with embodiments described herein.

FIGS. 20, 21, 22 and 23 are flow diagrams of methods facilitating mobile advertising in accordance with embodiments described herein. Turning first to FIG. 20, at 2002, method 2000 can include displaying, by a first display device including a first processor, first electronic advertising content. At 2004, method 2000 can include displaying, by a second display device including a second processor, second advertising content, wherein the second display device and the first display device are adjustably positioned in an arrangement relative to one another to display an advertising message, wherein the advertising message is composed of the first electronic advertising content and the second electronic advertising content, and wherein the first display device and the second display device are mobile devices.

In some embodiments, the first display device and the second display device can be configured to be operated using a control device that can emit a control signal for controlling one or more operations of the first and second display device. For example, the control device can be a remote control device configured to transmit a control signal over a wireless, infrared or optical channel on a frequency assigned to the first display device and/or the second display device. The control device can control the first and/or second display devices to begin display of the advertising content accessed by the first display device and the second display device. For example, the control device can transmit a control signal that can be received by the first display device and the second display device simultaneously (or substantially simultaneously) to cause the first and second display devices to initiate playback and display of the advertisement content accessible to the first and/or second display device. The content can display from a display region of the first and second display devices simultaneously or substantially simultaneously to provide mobile advertising in various embodiments.

The advertising content can include, but is not limited to, video, still images, audio or the like. Videos advertising content contemplated herein can be any number of different types of format including, but not limited to, H.264 formats, Moving Pictures Expert Group (MPEG)-1, -2 or -4 formats, Digital Video (DV), Windows Media Video or the like. The file formats for the video advertising content can include, but is not limited to, .MOV file, MP4 file, AVI file, MPEG-4 Part 14 file, Flash Player (FLV) file, Mastroska (MKV) file and/or Digital Video Object (DVO) file.

In various embodiments, the first and/or second display device can also emit audio during playback and display of video or audio. Accordingly, the advertising content can be accompanied by audio in some embodiments and can be a substantially soundless display in other embodiments.

In various embodiments, the first display device (e.g., display device 102) and/or the second display device (e.g., display device 104) can be any number of different mobile devices having portable power supplies (e.g., battery 600, solar energy collector 602) and configured to display advertising content accessed by the first display device and/or the second display device. In one embodiment, the display devices can be any number of portable devices including a display screen (e.g., display component 304), electrical circuitry for reading and/or displaying electronic advertising content via the display screen, electrical circuitry for receiving a control signal to initiate playback of the advertising content and a portable power supply (e.g., battery 600) for powering the display device. In some embodiments, the display device includes one or more ports (e.g., I/O component 312) for receipt of the interface to a portable storage device (e.g., storage device 110) storing advertising content. As used herein, the battery 600 (and/or other batteries referenced herein) can be or include the LIPO batteries and/or the other power supplies shown and/or described with reference to FIG. 7. In some embodiments, the electrical circuitry can include, but is not limited to, any of the components of advertising content control component 302.

In some embodiments, the same advertising content can be stored on respective storage devices (e.g., universal serial bus (USB) cards) assigned to the first display device and the second display device, respectively. Each storage device can be electrically coupled to the display device to which it is assigned such that the display device can access the electronic advertising content stored on the storage device. For example, in some embodiments, a storage device having a USB interface can be inserted into a USB port of the display device, and the display device can access the contents of the storage device via the USB port.

In some embodiments, in lieu of, or in addition to, circuitry for receiving and accessing advertising content pre-stored on a storage device, the display device includes a receiver (e.g., receiver 204, receiver 202) configured to receive advertising content transmitted over a wireless channel (e.g., wireless channel 206). In some embodiments, the display device also includes a transmitter (e.g., within communication component 300) configured to transmit one or more types of information from the display devices. The display devices can be any number of different shapes and sizes allowing convenient transport of the display devices.

In some embodiments, the first electronic advertising content is the same set of information as the second electronic advertising content. In this embodiment, the advertising message displayed is a tiled message composed of the first electronic advertising content on each display screen, for example. FIGS. 15, 16, 17 and 18 illustrate examples of these embodiments with the display devices 102, 104 arranged in different configurations. As shown in FIGS. 15, 16, 17 and 18, the display devices display the same advertising content on each display component (e.g., display screen) and create a tiled effect of the electronic advertising content.

In other embodiments, the first electronic advertising content is distinct from the second advertising content. For example, as shown in FIG. 19, the first display device 102 and the second display device 104 can be arranged relative to one another (e.g., horizontally adjacent, vertically adjacent, horizontally staggered, vertically staggered, in a circular formation or any number of other shape formation) and can display an advertising message composed of a combination of the individual advertising content displayed on the different display devices 102, 104. As shown in FIG. 19, different content is assigned to different display devices 102, 104 and forms a single, composite advertising message upon arrangement of the display devices 102, 104 in close proximity to one another. In one embodiment, one or more display devices can communicate with one another to determine which display device will display which content to provide a coordinated display of a single message. In some embodiments, a central controller having a processor and configured to communicate electrical signals with the display devices by wired or wireless communication can communicate with numerous ones of the display devices to cause the different display devices to respectively display different portions of the electronic advertising content to result in one unified message. In yet other embodiments, the specific content to be displayed on each display device can be determined (e.g., by the advertising content control component 302) and each of the display devices can display the specific content to provide a single, unified electronic advertising message.

While the embodiment described includes two display devices 102, 104, any number of display devices 102, 104 can be employed and are envisaged in the embodiments described herein. Further, in some embodiments, a single display device 102 can be employed to provide mobile advertising in isolation without other display devices 102, 104. For example, the single display device 102 can wirelessly receive or access pre-stored advertising content and display the advertising content in one or more geographic locations to which the display device 102 will be located from time to time.

Figure 21:
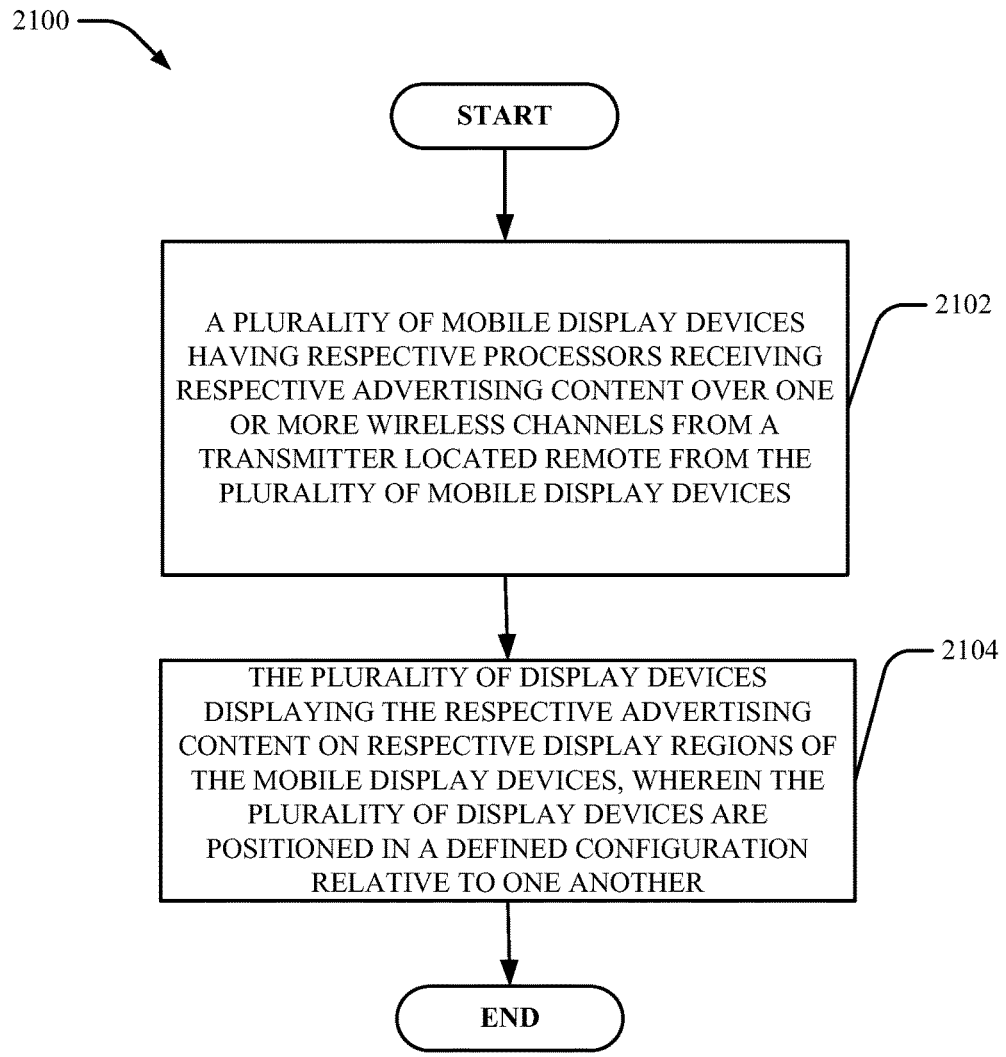

Turning now to FIG. 21, at 2102, method 2100 can include a plurality of mobile display devices having respective processors receiving respective advertising content over one or more wireless channels from a transmitter located remote from the plurality of mobile display devices. For example, each of the respective advertising content can be provided with an identifier associated with a receiver at the respective display device for which the advertising content is intended. The respective mobile display device can receive and display the advertising content associated with the receiver for the respective display device. In another embodiment, each of the plurality of display devices receive a set of advertising content and the respective receivers at the display devices filter the advertising content such that the receivers receive and/or display only the advertising content intended for the respective receiver of interest.

At 2104, method 2100 can include the plurality of display devices displaying the respective advertising content on respective displays regions of the display devices.

In some embodiments, although not shown, method 2100 can also include one or more of the display devices synchronizing the received advertising content between one another such that a start time for display/playback of the respective received advertising content is the same or within an acceptable delay range (e.g., 1-10 milliseconds) of display. In some embodiments, although also not shown, the display devices can simultaneously or substantially simultaneously receive a control input configured to cause the display devices to have a synchronized display/playback start time.

Figure 22:
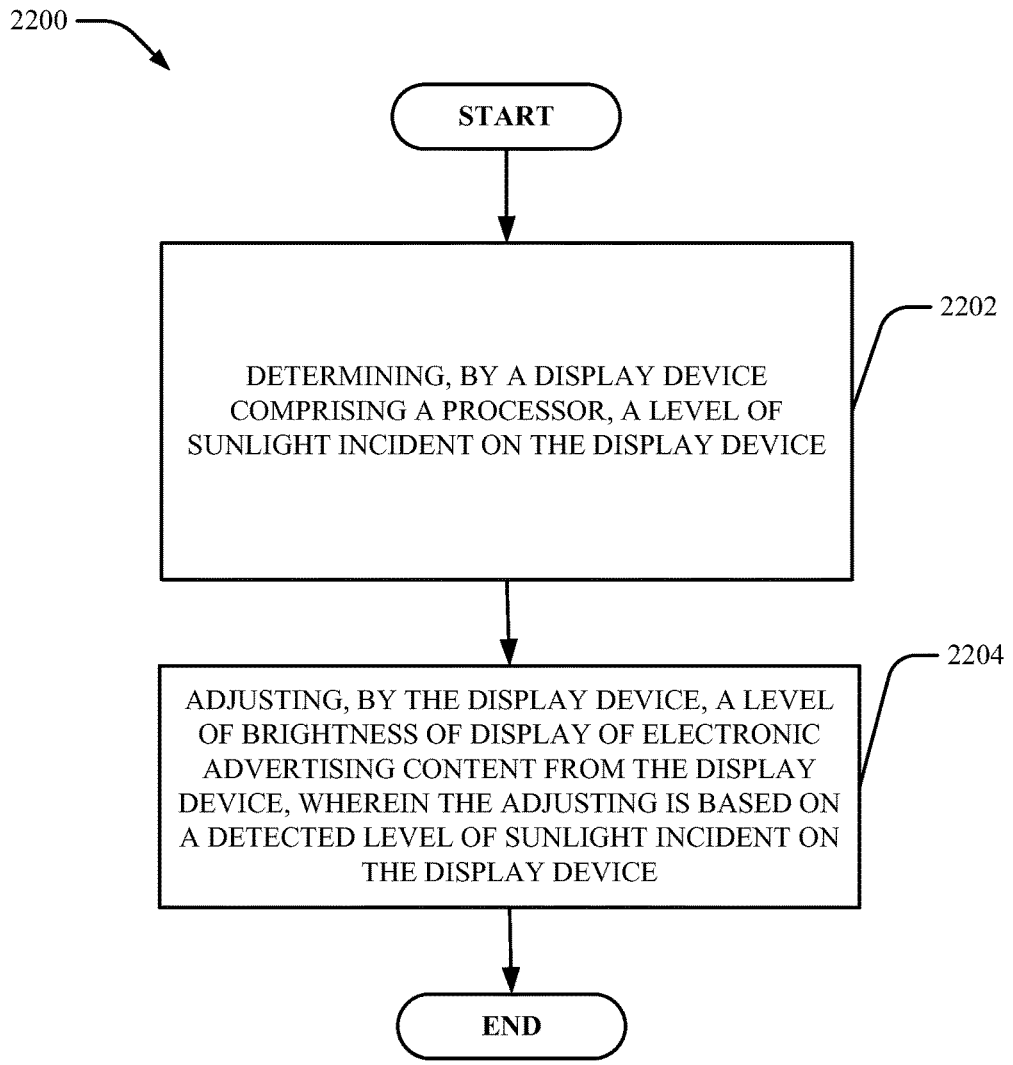

Turning now to FIG. 22, at 2202, method 2200 can include determining, by a display device including a processor, a level of sunlight incident on the display device. For example, in some embodiments, the level of sunlight can be determined by a sensor (e.g., sensor 502, photodetector). At 2204, method 2200 can include adjusting, by the display device, a level of brightness of display of electronic advertising content from the display device, wherein the adjusting is based on a detected level of sunlight incident on the display device (e.g., by a brightness control component 306). In some embodiments, the brightness is adjusted by turning on or off (e.g., by the brightness control circuitry 504) a defined number of light sources (e.g., light source 500) or light emitting diodes.

Figure 23:
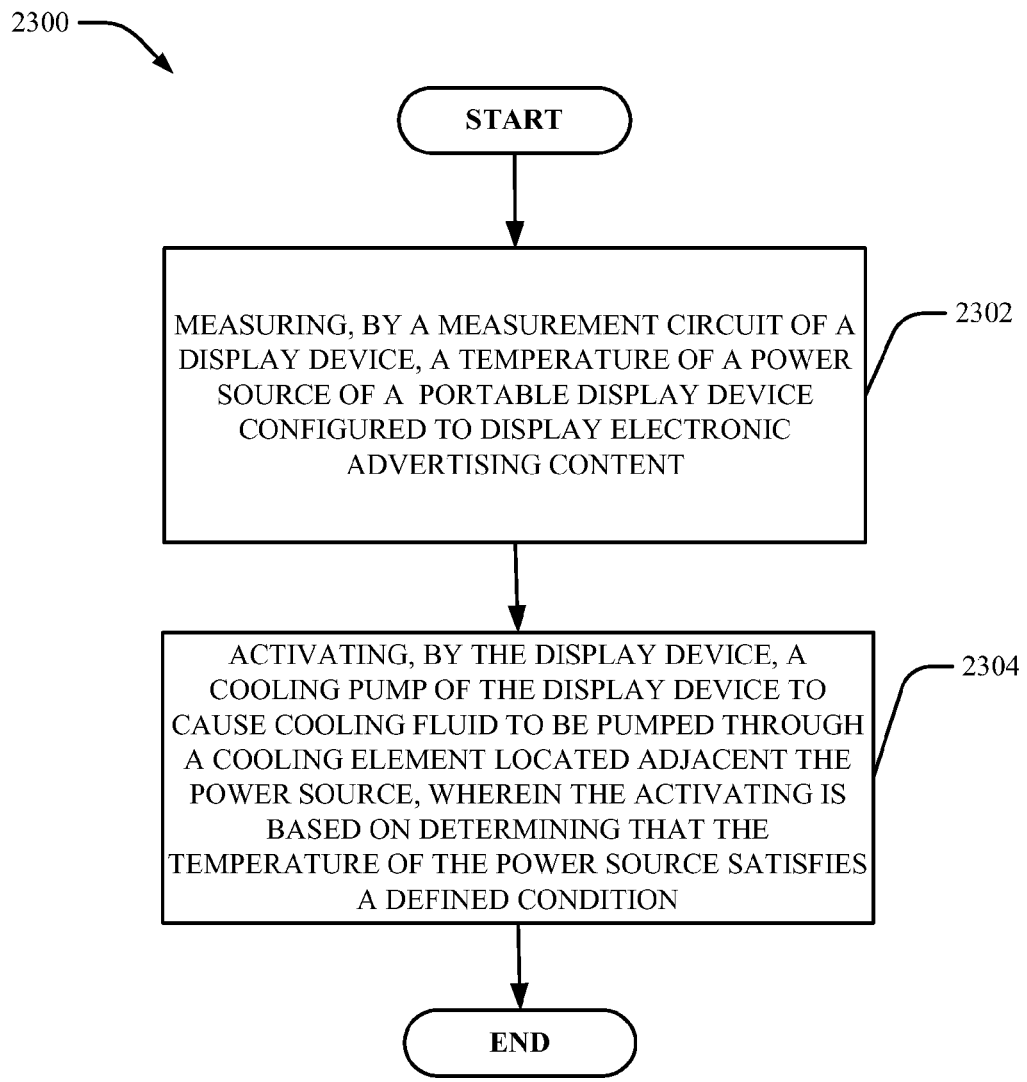

Turning now to FIG. 23, at 2302, method 2300 can include measuring, by a measurement circuit of a display device, a temperature of a power source of a portable display device configured to display electronic advertising content (e.g., by measuring circuitry 610). At 2304, method 2300 can include activating, by the display device, a cooling pump of the display device to cause cooling fluid to be pumped through a cooling element located adjacent the power source, wherein the activating is based on determining that the temperature of the power source satisfies a defined condition (e.g., by the cooling control component 606).

Figure 24:
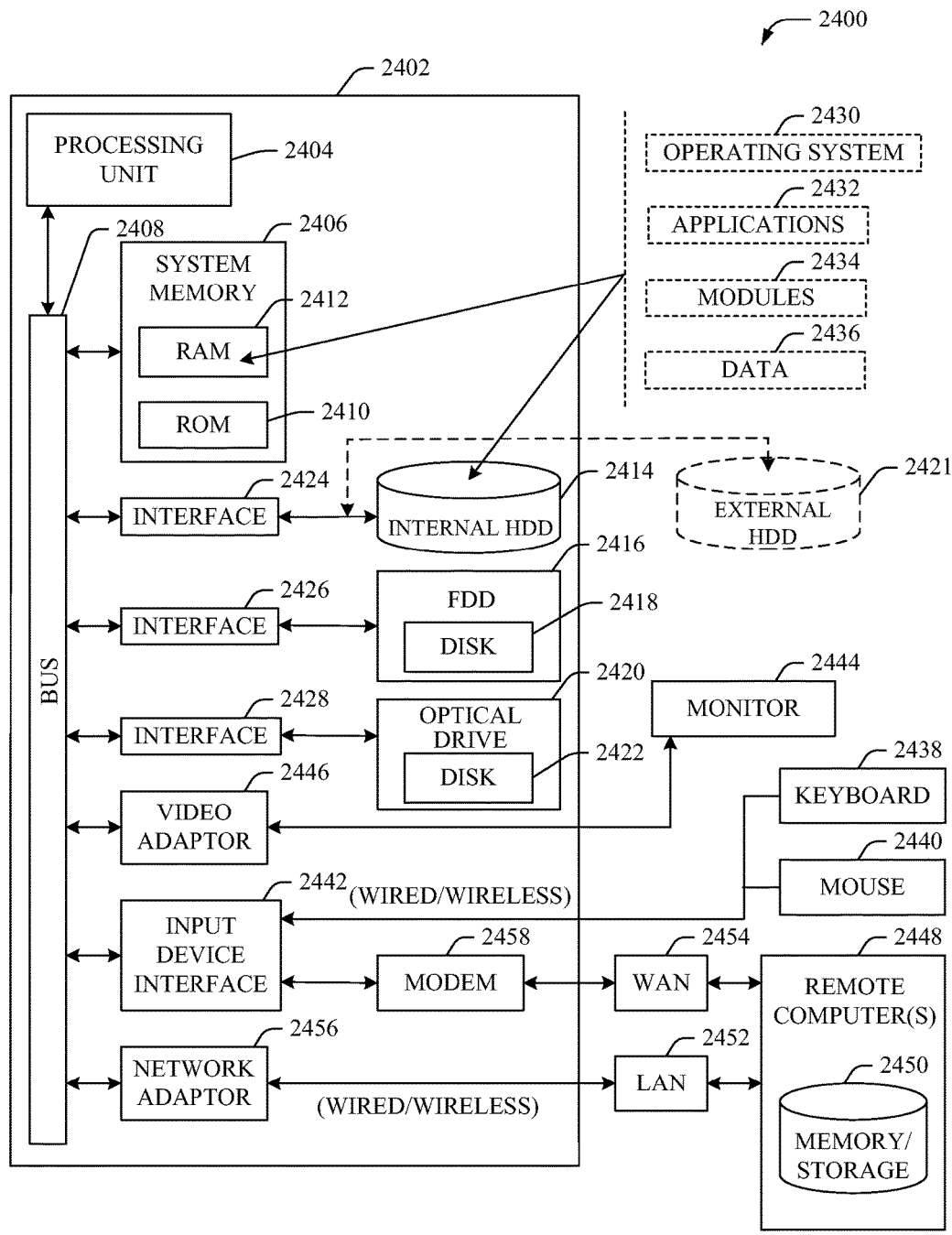
FIG. 24 is an illustration of a non-limiting exemplary computer operable to facilitate a mobile advertising system in accordance with embodiments described herein.

FIG. 24 is an illustration of a non-limiting exemplary computer operable to facilitate a mobile advertising system in accordance with embodiments described herein. For example, in some embodiments, the computer can be or be included within any number of components described herein including, but not limited to, the display devices (or components thereof including, but not limited to, advertising content control component 302, display component 304, brightness control component 306, and/or elements of the cooling control component 308 and/or of the power source and cooling system 310, transmitters, receivers or the like).

In order to provide additional context for various embodiments described herein, FIG. 24 and the following discussion are intended to provide a brief, general description of a suitable computing environment 2400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 24, the example environment 2400 for implementing various embodiments of the embodiments described herein includes a computer 2402, the computer 2402 including a processing unit 2404, a system memory 2406 and a system bus 2408. The system bus 2408 couples system components including, but not limited to, the system memory 2406 to the processing unit 2404. The processing unit 2404 can be any of various commercially available processors. Dual microprocessors and other multiprocessor architectures can also be employed as the processing unit 2404.

The system bus 2408 can be any of several types of bus structure that can further interconnect to a memory bus (with or without a memory controller), a peripheral bus, and a local bus using any of a variety of commercially available bus architectures. The system memory 2406 includes ROM 2410 and RAM 2412. A basic input/output system (BIOS) can be stored in a non-volatile memory such as ROM, erasable programmable read only memory (EPROM), EEPROM, which BIOS contains the basic routines that help to transfer information between elements within the computer 2402, such as during startup. The RAM 2412 can also include a high-speed RAM such as static RAM for caching data.

The computer 2402 further includes an internal hard disk drive (HDD) 2414 (e.g., EIDE, SATA), which internal hard disk drive 2414 can also be configured for external use in a suitable chassis (not shown), a magnetic floppy disk drive (FDD) 2416, (e.g., to read from or write to a removable diskette 2418) and an optical disk drive 2420, (e.g., reading a CD-ROM disk 2422 or, to read from or write to other high capacity optical media such as the DVD). The hard disk drive 2414, magnetic disk drive 2416 and optical disk drive 2420 can be connected to the system bus 2408 by a hard disk drive interface 2424, a magnetic disk drive interface 2426 and an optical drive interface, respectively. The interface 2424 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 2412, including an operating system 2430, one or more application programs 2432, other program modules 2434 and program data 2436. All or portions of the operating system, applications, modules, and/or data can also be cached in the RAM 2412. The systems and methods described herein can be implemented utilizing various commercially available operating systems or combinations of operating systems.

A mobile device can enter commands and information into the computer 2402 through one or more wired/wireless input devices, e.g., a keyboard 2438 and a pointing device, such as a mouse 2440. Other input devices (not shown) can include a microphone, an infrared (IR) remote control, a joystick, a game pad, a stylus pen, touch screen or the like. These and other input devices are often connected to the processing unit 2404 through an input device interface 2442 that can be coupled to the system bus 2408, but can be connected by other interfaces, such as a parallel port, an IEEE 1394 serial port, a game port, a universal serial bus (USB) port, an IR interface, etc.

A monitor 2444 or other type of display device 102 can be also connected to the system bus 2408 via an interface, such as a video adapter 2446. In addition to the monitor 2444, a computer typically includes other peripheral output devices (not shown), such as speakers, printers, etc.

The computer 2402 can operate in a networked environment using logical connections via wired and/or wireless communications to one or more remote computers, such as a remote computer(s) 2448. The remote computer(s) 2448 can be a workstation, a server computer, a router, a personal computer, portable computer, microprocessor-based entertainment appliance, a peer device or other common network node, and typically includes many or all of the elements described relative to the computer 2402, although, for purposes of brevity, only a memory/storage device 2450 is illustrated. The logical connections depicted include wired/wireless connectivity to a local area network (LAN) 2452 and/or larger networks, e.g., a wide area network (WAN) 2454. Such LAN and WAN networking environments are commonplace in offices and companies, and facilitate enterprise-wide computer networks, such as intranets, all of which can connect to a global communications network, e.g., the Internet.

When used in a LAN networking environment, the computer 2402 can be connected to the local network 2452 through a wired and/or wireless communication network interface or adapter 2456. The adapter 2456 can facilitate wired or wireless communication to the LAN 2452, which can also include a wireless AP disposed thereon for communicating with the wireless adapter 2456.

When used in a WAN networking environment, the computer 2402 can include a modem 2458 or can be connected to a communications server on the WAN 2454 or has other means for establishing communications over the WAN 2454, such as by way of the Internet. The modem 1358, which can be internal or external and a wired or wireless device, can be connected to the system bus 2408 via the input device interface 2442. In a networked environment, program modules depicted relative to the computer 2402 or portions thereof, can be stored in the remote memory/storage device 2450. It will be appreciated that the network connections shown are example and other means of establishing a communications link between the computers can be used.

The computer 2402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and non-volatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. An apparatus, comprising:
 a first display device having a display region configured to display electronic content, wherein the first display device comprises internal circuitry providing an inverter and a power supply within a housing of the first display device, wherein the power supply comprises a plurality of batteries coupled to one another in parallel and wherein the power supply is coupled to the inverter to provide capacitance for more than seven hours of operation of the first display device; and
 a first support structure coupled to a first surface of the first display device and configured to attach to a wearer of the first display device to facilitate portability of the apparatus, wherein the display region is located on and provides the display of the electronic content from a second surface of the first display device, wherein the second surface of the first display device is an opposing surface to the first surface of the first display device, wherein the display region is configured to display the electronic content in a first direction that is opposite a second direction that the wearer of the first display device faces while wearing the first support structure.
2. The apparatus of claim 1, further comprising:
 a second support structure coupled to the first display device and disposed to be positioned against a surface in an environment in which the apparatus is located to support the apparatus in a defined fixed position.
3. The apparatus of claim 1, further comprising:
 a first film disposed on the second surface of the first display device and bearing one or more advertising messages, wherein the first display device is configured to vent heat generated within the first display device through a portion of the first display device on which the first film fails to be provided; and
 a second film disposed on a display region of the first display device, wherein the second film is substantially transparent.
4. The apparatus of claim 1, further comprising:
 a visor removably coupled to at least one region of the first display device, wherein the visor is comprised of a material adapted to filter or block sunlight.
5. The apparatus of claim 4, wherein the visor is configured to be flexibly positioned towards a first direction or a second direction, and wherein the visor is configured to be flexibly positioned towards the first direction based on the first display device being coupled to a second display device and the visor being positioned between the first display device and the second display device.
6. The apparatus of claim 1, further comprising:
 a light source within the first display device and composed of a plurality of light emitting diodes; and
 brightness control circuitry electrically coupled to the light source and configured to control a selected number of the plurality of light emitting diodes to illuminate to control a level of brightness of display of the electronic content.
7. The apparatus of claim 6, further comprising:
 at least one sensor configured to detect a level of light incident on the first display device and generate a signal detectable by the brightness control circuitry based on detection of the level of light, wherein the brightness control circuitry is further configured to control the selected number of the plurality of light emitting diodes to illuminate based on the signal.
8. The apparatus of claim 7, wherein the signal is a first signal based on a detected level of light satisfying a defined condition and wherein the signal is a second signal based on the detected level of light failing to satisfy the defined condition.

9. The apparatus of claim 1, further comprising:
a solar energy collector coupled to the first display device and configured to convert thermal energy to electricity, wherein the first display device is configured to be powered by the electricity, and wherein the solar energy collector is a solar power film disposed on one or more surfaces of the first display device.

10. The apparatus of claim 1, further comprising:
a battery coupled to and configured to power the first display device; and
a cooling element coupled to the first display device and positioned substantially adjacent at least a portion of the battery, wherein the cooling element is disposed to maintain cooling fluid and wherein the cooling fluid is disposed to reduce a temperature of the battery.

11. The apparatus of claim 10, further comprising the cooling fluid located within the cooling element.

12. The apparatus of claim 1, wherein the plurality of batteries comprises at least six 12.6 volt lithium ion polymer batteries connected to one another in parallel and wherein the inverter is a 12 volt 200 watt inverter and wherein the internal circuitry provides for seven to ten hours of operation of the first display device.

13. The apparatus of claim 1, wherein the first display device comprises a first plurality of brackets directly connected to the first surface of the first display device, wherein the first support structure is configured to interlock with the first plurality of brackets on the first surface of the first display device and cause each of the first display device and the first support structure to be substantially stationary, overlapping with one another over a spinal region of the wearer.

14. The apparatus of claim 1, wherein a bottom edge of the first display device is positioned approximately one to three feet from the ground when worn by the wearer.

15. The apparatus of claim 1, wherein the first display device has a diagonal that is greater than 35 inches and weighs at least 40 pounds.

* * * * *